United States Patent
Ko et al.

(10) Patent No.: US 10,719,865 B2
(45) Date of Patent: Jul. 21, 2020

(54) METHOD AND SYSTEM FOR PROVIDING RECOMMENDATION FOR SELECTION OF A MERCHANT STORE

(71) Applicant: SONY CORPORATION, Tokyo (JP)

(72) Inventors: Thomas Woonyoung Ko, Monroe Township, NJ (US); Makoto Koike, Tokyo (JP); Pramod Chintalapoodi, San Diego, CA (US)

(73) Assignee: SONY CORPORATION, Tokyo (JP)

(*) Notice: Subject to any disclaimer, the term of this patent is extended or adjusted under 35 U.S.C. 154(b) by 661 days.

(21) Appl. No.: 14/933,219

(22) Filed: Nov. 5, 2015

(65) Prior Publication Data

US 2016/0335702 A1    Nov. 17, 2016

Related U.S. Application Data

(60) Provisional application No. 62/160,701, filed on May 13, 2015.

(51) Int. Cl.
| | |
|---|---|
| *G06Q 30/00* | (2012.01) |
| *G06Q 30/06* | (2012.01) |
| *G06Q 50/00* | (2012.01) |
| *G06Q 30/02* | (2012.01) |

(52) U.S. Cl.
CPC ......... *G06Q 30/0631* (2013.01); *G06Q 30/02* (2013.01); *G06Q 30/0241* (2013.01); *G06Q 30/0251* (2013.01); *G06Q 50/01* (2013.01)

(58) Field of Classification Search
CPC .................................................... G06Q 30/00
See application file for complete search history.

(56) References Cited

U.S. PATENT DOCUMENTS

| | | | | |
|---|---|---|---|---|
| 8,204,784 | B2* | 6/2012 | Bhagchandani | G06Q 30/02 705/14.49 |
| 9,542,688 | B2* | 1/2017 | Bernard | G06Q 30/0201 |
| 9,767,231 | B2* | 9/2017 | Kashyap | G06F 17/30958 |
| 9,767,471 | B1* | 9/2017 | Perrone | G06Q 30/0205 |
| 9,953,333 | B1* | 4/2018 | Ng | G06Q 30/0629 |
| 2008/0154654 | A1* | 6/2008 | Niessen | G06Q 10/02 705/5 |

(Continued)

OTHER PUBLICATIONS

Adams, John, "American Express adds geolocation, analytics to it's iPhone App", American Banker, dated May 21, 2012 (Year: 2012).*

(Continued)

*Primary Examiner* — Mark A Fadok
(74) *Attorney, Agent, or Firm* — Chip Law Group

(57) ABSTRACT

Various aspects of a method and system to provide a recommendation for selection of a merchant store are disclosed herein. The method includes reception, by a server, of a recommendation request for selection of one or more merchant stores from a plurality of merchant stores. The recommendation request is associated with a beneficiary. The method further includes determination, at the server, of a score associated with each of the plurality of merchant stores based on a plurality of weighted parameters associated with the beneficiary. The method further includes generation of a recommendation, at the server, for the selection of the one or more merchant stores based on the determined score associated with each of the plurality of merchant stores.

25 Claims, 14 Drawing Sheets

(56) References Cited

U.S. PATENT DOCUMENTS

| | | | |
|---|---|---|---|
| 2010/0169160 A1 | 7/2010 | Wu et al. | |
| 2012/0109749 A1* | 5/2012 | Subramanian | G06Q 30/0255 705/14.53 |
| 2012/0284172 A1* | 11/2012 | Bryman | G06Q 30/02 705/38 |
| 2012/0316983 A1 | 12/2012 | Shinnebarger et al. | |
| 2013/0166445 A1* | 6/2013 | Isaacson | G06Q 30/0234 705/41 |
| 2013/0246300 A1* | 9/2013 | Fischer | G06Q 30/0222 705/347 |
| 2013/0268332 A1* | 10/2013 | Chyu | G06Q 30/02 705/14.17 |
| 2013/0311266 A1* | 11/2013 | Vichich | G06Q 20/387 705/14.27 |
| 2014/0012704 A1* | 1/2014 | Mizhen | G06Q 30/06 705/26.41 |
| 2014/0074569 A1* | 3/2014 | Francis | G06Q 20/40 705/14.3 |
| 2014/0089327 A1 | 3/2014 | Pavlidis et al. | |
| 2014/0258055 A1* | 9/2014 | Wolfe | G06Q 20/105 705/30 |
| 2014/0278795 A1* | 9/2014 | Satyamoorthy | G06Q 30/0201 705/7.33 |
| 2014/0278978 A1* | 9/2014 | O'Connor | G06Q 30/0255 705/14.53 |
| 2014/0372338 A1* | 12/2014 | Kim | G06Q 30/0282 705/347 |
| 2015/0032543 A1* | 1/2015 | Weis | G06Q 30/0261 705/14.58 |
| 2015/0332305 A1* | 11/2015 | Kodali | G06Q 30/0229 705/14.25 |
| 2016/0148297 A1* | 5/2016 | Kashyap | G06Q 30/0631 705/26.7 |
| 2016/0246901 A1* | 8/2016 | Kashyap | G06F 17/30958 |
| 2016/0335702 A1* | 11/2016 | Ko | G06Q 30/0631 |

OTHER PUBLICATIONS

International Search report on patentability received for PCT Application No. PCT/JP2016/001947, dated Jul. 5, 2016, p. 10.

* cited by examiner

| Weighted Category 502 | Weighted Sub-category 504 |
|---|---|
| frequency of usage 506 | • 506a: Current Time - 90 days: 1 point for each transaction (Range from 0 – 15)<br>• 506b: 90 - 180: 0.8 points for each transaction (Range from 0 – 10)<br>• 506c: 180 - 270: 0.5 points for each transaction (Range from 0 – 6)<br>• 506d: 270 - 360: 0.25 points for each transaction (Range from 0 – 3) |
| amount used and amount funded 508 | • 508a: Average amount used (Range from 0 – 12)<br>• 508b: Frequency of load in 1 year (Range from 0 – 12)<br>• 508c: Amount used compared to fund (Range from 0 – 12) |
| time and location 510 | • 510a: Local availability: (Range from 0 - 10)<br>    if distance:<br>        < 5 miles – 6 points<br>        5 – 20 miles – 4 points<br>        > 20 miles – 2 points<br>        (type = Franchise) –> 2 points<br>        (type = E-commerce store) –> 2 points<br>• 510b: Proximity to present date: (Range from 0 - 10) |
| current value 512 | • 512a: Actual Balance (Range from 0 - 5)<br>• 512b: Balance compared to total (Range from 0 - 5) |

FIG. 5A

| Weighted Category 502 → | frequency of usage 506 | amount used and amount funded 508 | time and location 510 | current value 512 | cumulative score 524 |
|---|---|---|---|---|---|
| Merchant Store 522 ↓ | | | | | |
| $ Merchant Store A | 9 | 22.4 | 12 | 8.1 | 51.5 |
| $ Merchant Store B | 4.75 | 24.34 | 12 | 5 | 46.09 |
| $ Merchant Store C | 2.6 | 14.69 | 14 | 4.22 | 35.51 |
| $ Merchant Store D | 0.8 | 1 | 6 | 3.05 | 10.85 |

METHOD AND SYSTEM FOR PROVIDING RECOMMENDATION FOR SELECTION OF A MERCHANT STORE

CROSS-REFERENCE TO RELATED APPLICATIONS/INCORPORATION BY REFERENCE

The present application claims priority to U.S. Provisional Application Ser. No. 62/160,701, filed May 13, 2015, the disclosure of which is herein incorporated by reference in its entirety.

FIELD

Various embodiments of the disclosure relate to providing a recommendation for selection of a merchant store. More specifically, various embodiments of the disclosure relate to providing a recommendation for selection of a merchant store from a plurality of merchant stores.

BACKGROUND

With the advent of electronic monetary transactions in the field of financial transaction processing, financial and/or business institutions are inclined to provide lucrative financial offerings to their consumers. Such advancements have contributed to an increasingly popular use of virtual currency instruments by the consumers. Virtual currency instruments may facilitate use of virtual currency, which may be a digital representation of a value that may be digitally traded. The virtual currency may be unregulated digital money that may function as a medium of exchange, a unit of account, and/or a store of value for a monetary transaction. Examples of the virtual currency instruments may include, but are not limited to, air miles, loyalty points, credit card points, physical coupons, app-based coins and tokens, mobile coupons, and time and transaction data exchanged for digital content.

In certain scenarios, a user may intend to purchase a virtual currency instrument offered by a merchant as a gift for another user. In such a scenario, the virtual currency instrument offered by the merchant may not be preferred by the other user due to multiple reasons. An example of one of such reasons may be that location of the merchant store is beyond a radius of "25 miles", from the location of the other user. In such scenarios, it may be desirable that a virtual currency instrument is selected by the user based on one or more preferences related to the other user.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and a system to provide a recommendation for the selection of a merchant store are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIGS. 5A, 5B, and 5C collectively illustrate an exemplary scenario to provide a recommendation for selection of a merchant store, in accordance with an embodiment of the disclosure.

DETAILED DESCRIPTION

Figure 1:
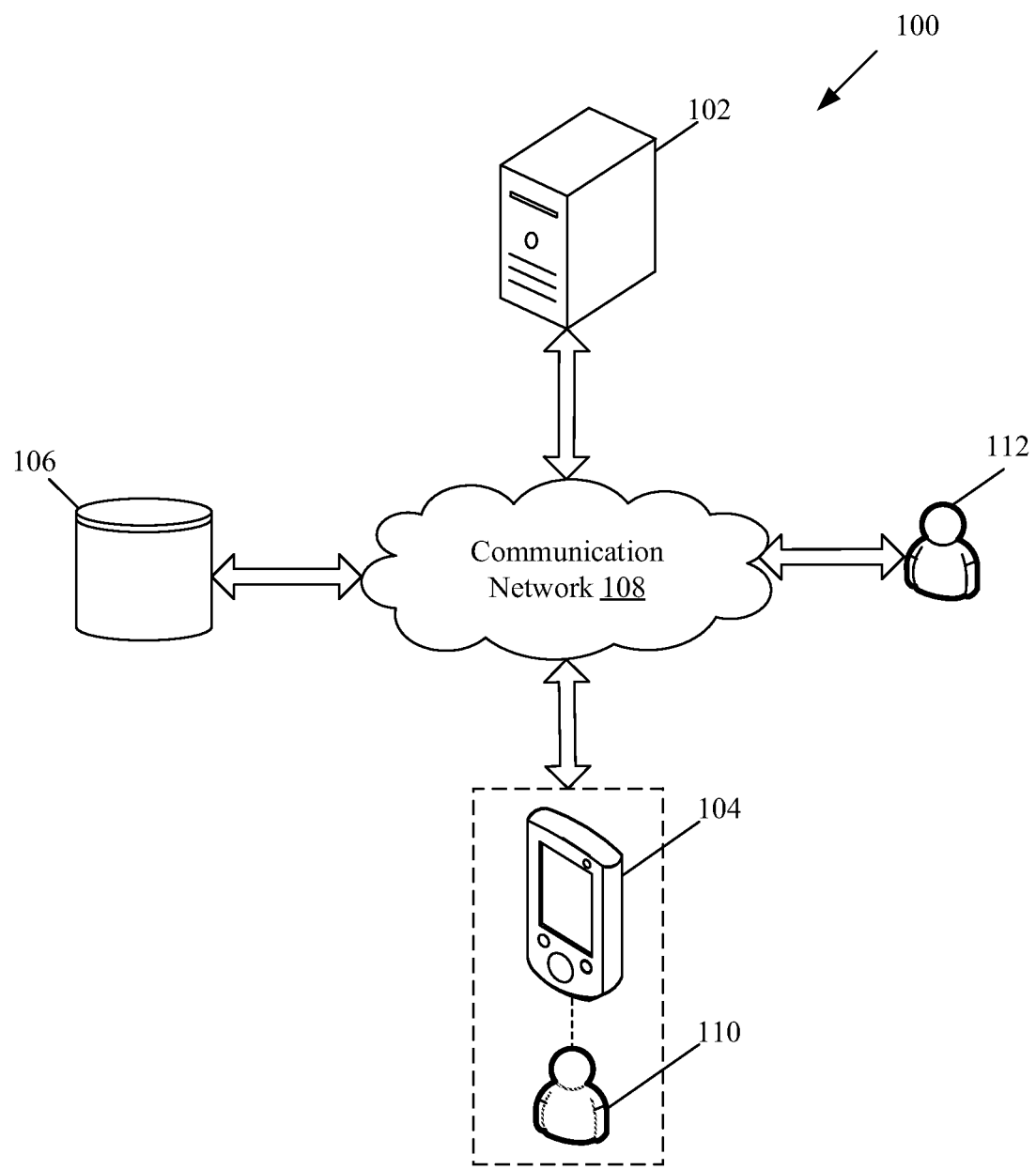
FIG. 1 is a block diagram that illustrates a network environment to provide a recommendation for selection of a merchant store, in accordance with an embodiment of the disclosure.

Various implementations may be found in a method and/or system to provide a recommendation for selection of a merchant store. The following embodiments are described in sufficient detail to enable those skilled in the art to make and use the disclosed embodiments. It is to be understood that other embodiments would be evident based on the present disclosure, and that system, process, or mechanical changes may be made without departing from the scope of the present disclosure.

In the following description, numerous specific details are given to provide a thorough understanding of the disclosure. However, it may be apparent that the disclosed embodiments may be practiced without these specific details. In order to avoid obscuring the present disclosure, some well-known circuits, system configurations, and/or process steps are not disclosed in detail.

The drawings the show embodiments of the system are semi-diagrammatic and not to scale and, particularly, some of the dimensions are for the clarity of presentation and are shown exaggerated in the drawings. Where multiple embodiments are disclosed and described with some features in common, for clarity and ease of illustration, description, and comprehension thereof, similar and like features one to another will ordinarily be described with similar reference numerals.

FIG. 1 is a block diagram that illustrates a network environment to provide a recommendation for selection of a merchant store, in accordance with an embodiment of the disclosure. With reference to FIG. 1, there is shown a server 102, an electronic device 104, and a database server 106. There are further shown a first user 110 and a second user 112. The server 102 may be communicatively coupled to the electronic device 104 and the database server 106, via a communication network 108. The first user 110 may be associated with the electronic device 104. The second user 112 may be related to the first user 110.

The server 102 may comprise suitable logic, circuitry, interfaces, and/or code that may be configured to receive one or more recommendation requests from a plurality of merchant stores for selection of one or more merchant stores. The server 102 may be further configured to determine a score associated with each of the plurality of merchant stores. The server 102 may be further configured to generate one or more recommendations based on the determined score. The server 102 may be implemented based on one or more technologies known in the art.

The electronic device 104 may comprise suitable logic, circuitry, interfaces, and/or code that may be configured to facilitate a user, such as the first user 110, to initiate one or more recommendation requests for selection of one or more merchant stores from the plurality of merchant stores. The electronic device 104 may be further configured to receive identification information associated with a beneficiary, such as the second user 112, from the first user 110. The electronic device 104 may further include a display screen 104a. The display screen 104a may be realized through several known technologies that may include, but are not limited to, Liquid Crystal Display (LCD) display, Light Emitting Diode (LED) display, Organic LED (OLED) display technology. Examples of the electronic device 104 may include, but are not limited to, a laptop, a cash register, a tablet, a mobile device, wireless pagers, electronic signature-capture devices, a personal digital assistant (PDA) device, or other such portable electronic communication devices.

The database server 106 may comprise suitable logic, circuitry, interfaces, and/or code that may be configured to store the personal details of the users, such as the first user 110 and/or the second user 112, which may be registered with the server 102. The database server 106 may be further configured to store the details of the plurality of merchant stores and the virtual currency instruments of each of the plurality of merchant stores. The database server 106 may be further configured to store other data associated with the users, such as a preferred merchant store of a user, one or more weighted parameters associated with a user, transaction history of a user that corresponds to a merchant store, and/or details of one or more other users associated with a user. The database server 106 may be implemented by use of several technologies that are well known to those skilled in the art.

The communication network 108 may include a medium through which the server 102 may communicate with the electronic device 104, and/or the database server 106. Examples of the communication network 108 may include, but are not limited to, the Internet, a cloud network, a Long Term Evolution (LTE) network, a Wireless Fidelity (Wi-Fi) network, a Wireless Local Area Network (WLAN), a Local Area Network (LAN), a telephone line (POTS), and/or a Metropolitan Area Network (MAN). Various devices in the network environment 100 may be operable to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), Hypertext Transfer Protocol Secure (HTTPS), File Transfer Protocol (FTP), Zigbee, EDGE, infrared (IR), IEEE 802.11, 802.16, cellular communication protocols, and/or Bluetooth (BT) communication protocols.

The first user 110 may be pre-registered with the server 102. The first user 110 may initiate one or more recommendation requests, by use of the electronic device 104. The one or more recommendation requests may correspond to a request to receive one or more recommendations for selection of one or more merchant stores from the plurality of stores. The first user 110 may further select one or more virtual currency instruments associated with the recommended one or more merchant stores.

The second user 112 may be a beneficiary to whom the one or more virtual currency instruments may be issued, based on the selection provided by the first user 110. The second user 112 may provide one or more preferences, based one which the one or more recommendations may be generated. The one or more recommendations may be further generated, based on preferences provided by one or more other users (not shown) associated with the second user 112.

In operation, the first user 110 may initiate a request for generation of one or more recommendations for selection of one or more merchant stores from the plurality of merchant stores. The request may be initiated via the display screen 104a of the electronic device 104. In accordance with an embodiment, the first user 110 may provide identification information of the second user 112 to the electronic device 104, via the display screen 104a. The identification information may comprise a second user identifier and/or a passkey of the second user 112. Notwithstanding, the disclosure may not be so limited, and the identification information of the second user 112 may comprise other details, without limiting the scope of the disclosure.

The electronic device 104 may process the one or more recommendation requests, based on one or more of a messaging service, service-based transactional payment, a direct mobile billing, and/or a mobile web payment (WAP). The electronic device 104 may be configured to transmit the received identification information to the server 102, via the communication network 108. In accordance with an embodiment, the electronic device 104 may include a pre-installed mobile application for reception and transmission of the identification information.

Based on the received identification information, the server 102 may be configured to transmit a query to the database server 106, via the communication network 108. In response to the received query, the database server 106 may compare the received identification information with pre-stored details of a plurality of users in a local repository. In case of an unsuccessful comparison, the database server 106 may transmit a notification to the server 102. In case of a successful comparison, the database server 106 may be operable to retrieve the personal details of the second user 112. In such a case, the database server 106 may be configured to transmit the retrieved personal details of the second user 112 to the server 102. Examples of the transmitted personal details may include, but are not limited to, name, address, email address, phone number, nationality, age, gender, and/or a contact list of the second user 112. In accordance with an embodiment, the server 102 may determine an association of the second user 112 with the one or more other users, based on the contact list of the second user 112.

The server 102 may be configured to transmit the received personal details of the second user 112 to the electronic device 104, via the communication network 108. The electronic device 104 may be configured to render the received personal details of the second user 112 on the display screen 104a. Based on the rendered personal details of the second user 112, the first user 110 may provide an input that may correspond to a validation of the rendered personal details of the second user 112. The input provided by the first user 110 may be based on the identification information of the second user 112. The first user 110 may provide the input via the display screen 104a of the electronic device 104. The electronic device 104 may be further configured to transmit the result of the validation to the server 102, via the communication network 108.

Based on the successful validation of the personal details of the second user 112, the server 102 may be configured to retrieve the transaction data of the second user 112, from the database server 106. In accordance with an embodiment, when the database server 106 is integrated with the server 102, the transaction data may be retrieved from local memory present at the server 102. In instances when the validation of the second user 112 is unsuccessful, the server 102 may be configured to transmit a notification to the electronic device 104. The notification may indicate a failure to identify the second user 112.

In accordance with an embodiment, the transaction data of the second user 112 may correspond to one or more virtual currency instruments associated with the second user 112. Each of the one or more virtual currency instruments may correspond to a merchant store of the plurality of merchant stores. The transaction data may further correspond to a monetary value associated with each of the one or more virtual currency instruments of the second user 112. The transaction data may further correspond to a transaction history of the second user 112, associated with each of the plurality of merchant stores. In accordance with an embodiment, the transaction data may further comprise a set of user preferences. The set of user preferences may comprise a merchant store preferred by the second user 112, a merchant store preferred by one or more other users in the contact list of the second user 112, a preferred denomination of a virtual currency instrument at a merchant store, and/or a category of service associated with one or more virtual currency instruments. Notwithstanding, the disclosure may not be so limited, and the transaction data may comprise other data associated with the second user 112, without limiting the scope of the disclosure.

In accordance with an embodiment, based on the transaction data of the second user 112, the server 102 may be configured to determine one or more weighted parameters. The determined one or more weighted parameters may be classified in one or more categories, such as a first category, a second category, a third category, and a fourth category. The server 102 may be further configured to determine a score associated with each of the weighted parameters based on the received transaction data of the second user 112. The server 102 may be further configured to generate one or more recommendations based on the determined score of each of the weighted parameters.

In accordance with an embodiment, the first category may correspond to a frequency of usage of each virtual currency instrument by the second user 112 at each of the plurality of merchant stores. The frequency of usage may be determined based on the transaction history of the second user 112 for a merchant store. The transaction history may be categorized in a plurality of time-based ranges. Each of the plurality of time-based ranges may be associated with a weighted frequency-based score. Based on the number of transactions made by the second user 112 at the merchant store in each of the time-based ranges, and the weighted frequency-based scores to which the transactions correspond, the server 102 may be configured to compute a cumulative frequency-based score for the merchant store in the first category.

In accordance with an embodiment, the second category may correspond to an amount of monetary value used for a virtual currency instrument associated with a merchant store. The second category may further correspond to the provision of funding of the virtual currency instrument associated with the merchant store with a specific amount of monetary value. The second category may comprise one or more amount-based sub-categories for the transaction history of the second user 112. The one or more amount-based sub-categories may be referred to as a first amount-based sub-category, a second amount-based sub-category, and a third amount-based sub-category.

The first amount-based sub-category may correspond to an average of amount of a monetary value associated with a virtual currency instrument used by the second user 112, at a merchant store. The server 102 may be configured to compute an average amount of monetary value of the virtual currency instrument at the merchant store. In accordance with an embodiment, the computed average amount for each of the plurality of merchant stores may be mutually weighted. In such a case, the server 102 may be configured to compute a cumulative first amount-based sub-category score for the second user 112.

The second amount-based sub-category may correspond to a frequency of funding a virtual currency instrument associated with the merchant store with the specific amount of monetary value. Based on the number of transactions when the virtual currency instrument is funded with the amount of monetary value, the server 102 may be configured to compute a second amount-based sub-category score for each of the plurality of merchant stores. The third amount-based sub-category may correspond to a ratio of a cumulative amount of monetary values associated with the virtual currency instrument used by the second user 112 at each of the plurality of merchant stores and a cumulative amount of monetary values funded to the virtual currency instrument by second user 112 at each of the plurality of merchant stores. Based on the determined ratio, the server 102 may be configured to compute a third amount-based sub-category score for each of the plurality of merchant stores. The server 102 may be configured to compute a cumulative amount-based score for the second category, for each of the plurality of merchant stores, based on a summation of the computed first amount-based sub-category score, the second amount-based sub-category score, and the third amount-based sub-category score.

In accordance with an embodiment, the third category may correspond to location of the plurality of merchant stores with respect to the location of the second user 112. The third category may further correspond to date and/or time of usage of a virtual currency instrument for a transaction with respect to current date and/or time. The third category may comprise a location-based sub-category and a time-based sub-category. In accordance with an embodiment, the server 102 may categorize the transaction history of the second user 112 for a merchant store in a plurality of location-based ranges. Each of the plurality of location-based ranges may be associated with a weighted location-based score. The server 102 may be further configured to compute a location-based score that corresponds to each transaction of the transaction history for each of the plurality of merchant stores, based on a type of a merchant store. In accordance with an embodiment, the type of the merchant store may correspond to one of a franchise or an E-commerce store. The time-based sub-category may correspond to date and/or time of usage of the virtual currency instrument associated with each of the plurality of merchant stores. The date and/or time of usage of the virtual currency instrument, for a transaction, may be determined with respect to a current date and/or time. The server 102 may be configured to compute a weighted time-based score, based on the proximity of the date and/or time of usage of the virtual currency instrument to the current date and/or time. The server 102 may be configured to compute a cumulative location and time-based score for the third category, for each of the plurality of merchant stores, based on a summation of the computed location-based score and the time-based score.

In accordance with an embodiment, the fourth category may correspond to a balance amount of a monetary value associated with the virtual currency instrument associated with the second user 112. The fourth category may comprise a first balance-based sub-category and a second balance-based sub-category. The first balance-based sub-category may correspond to a balance of a monetary value associated with the virtual currency instrument associated with the second user 112. The server 102 may be configured to compute a relative first balance-based score for each of the plurality of merchant stores. The second balance-based sub-category may correspond to a ratio of the balance monetary value of the virtual currency instrument to an amount of monetary value funded to the virtual currency instrument. The server 102 may be configured to compute a second balance-based score for each of the plurality of merchant stores. The computed second balance-based score may be inversely proportional to balance monetary value of the virtual currency instrument. The server 102 may be configured to compute a cumulative balance-based score for the fourth category, for each of the plurality of merchant stores, based on a summation of the computed first balance-based score and the second balance-based score.

In accordance with an embodiment, the server 102 may be configured to determine a cumulative score from the computed scores for each of the one or more categories, for each of the plurality of merchant stores. The server 102 may be further configured to generate a rank of the plurality of merchant stores, based on the computed score for each of the plurality of merchant stores. In accordance with an embodiment, the server 102 may be configured to generate a rank associated with the one or more merchant stores, based on preferences received from one or more other users associated with the second user 112. In accordance with an embodiment, the server 102 may be configured to generate a rank associated with the one or more merchant stores, based on preferred merchant stores of one or more other users associated with the second user 112. In such a case, the preferred merchant stores of one or more other users may correspond to the alternate merchant stores.

In accordance with an embodiment, the server 102 may be configured to select one or more merchant stores from the plurality of merchant stores. The selection of one or more merchant stores from the plurality of merchant stores may be based on pre-determined criteria. In accordance with an embodiment, based on the pre-determined criteria, the determined cumulative score may be compared with a pre-determined value. In accordance with an embodiment, the server 102 may be configured to select merchant stores from the plurality of merchant stores, for which the cumulative score exceeds the pre-determined value, for generation of customized recommendations. The one or more other merchant stores of the plurality of merchant stores, for which the cumulative score does not exceed the pre-determined value, may not be selected for generation of customized recommendations.

In accordance with an embodiment, the server 102 may be configured to indicate one or more virtual currency instruments associated with generated customized recommendation. The indicated virtual currency instrument may be associated with a merchant store of the one or more merchant stores. In accordance with an embodiment, the server 102 may be configured to indicate transaction data of the second user 112, in the generated customized recommendation. In accordance with an embodiment, the server 102 may be configured to indicate transaction data of the one or more other users associated with second user 112, in the generated customized recommendation. In accordance with an embodiment, the generated customized recommendation may further indicate one or more alternate merchant stores that may be distinct from the preferred merchant store in the transaction data of the second user 112.

The server 102 may be configured to transmit the generated rank and/or customized recommendation to the electronic device 104, via the communication network 108. The electronic device 104 may be configured to display the received rank and/or the customized recommendation on the display screen 104a. The displayed rank and/or the customized recommendation may comprise a selectable field to choose from the one or more recommended merchant stores. The displayed rank and/or the customized recommendation may further comprise a user-selectable option to select the virtual currency associated with the one or more merchant stores. In accordance with an embodiment, the electronic device 104 may be further configured to display a field to specify a monetary value for the selected virtual currency instrument of the one or more merchant stores.

The electronic device 104 may be configured to receive a selection of one or more merchant stores, virtual currency instruments associated with the selected merchant store, and/or a monetary value associated with the virtual currency instruments, form the first user 110. The selection may be received via the display screen 104a. In accordance with an embodiment, the electronic device 104 may include a pre-installed web interface to implement net-banking payments to make one or more payments that corresponds to one or more virtual currency instruments associated with the selected one or more merchant stores.

The electronic device 104 may be configured to transmit the received selection to the server 102. The server 102 may be configured to issue the selected virtual currency instruments with the monetary value specified by the first user 110, to the second user 112. The server 102 may be further configured to update the transaction data of the second user 112 in the database server 106, based on the issuance of the virtual currency instrument.

Figure 2:
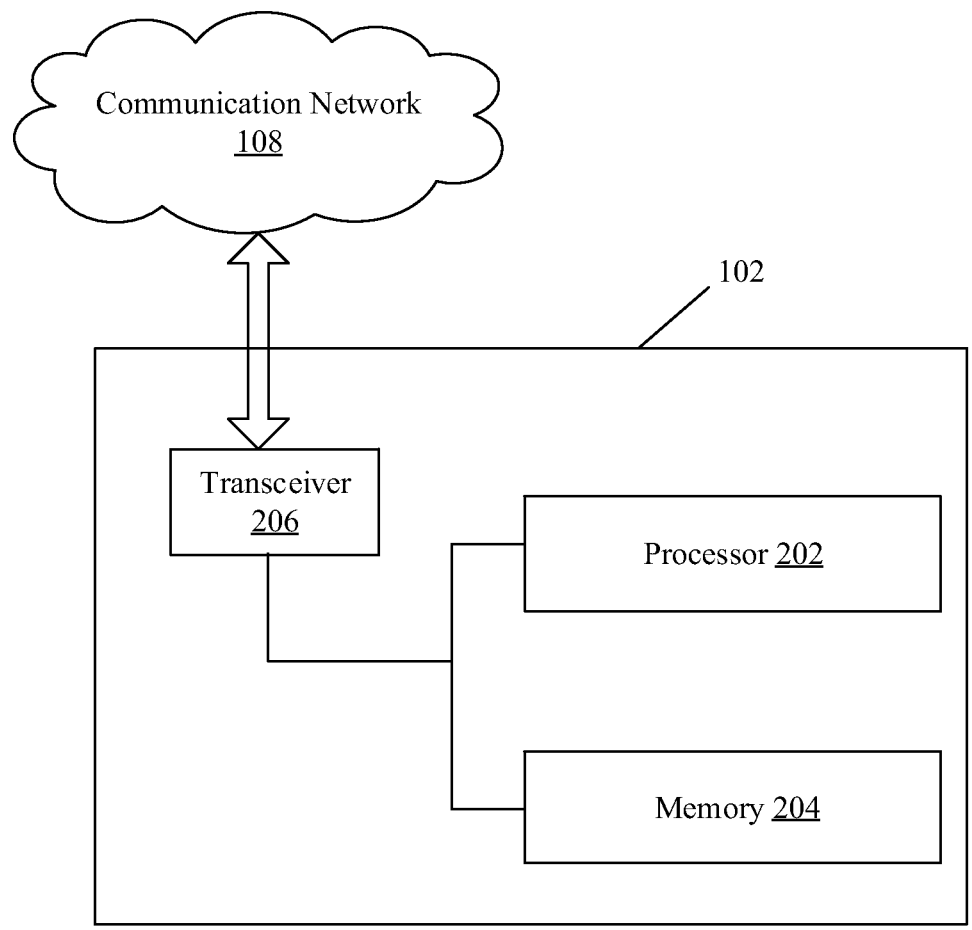
FIG. 2 is a block diagram that illustrates an exemplary server that provides a recommendation for selection of a merchant store, in accordance with an embodiment of the disclosure.

FIG. 2 is a block diagram that illustrates an exemplary server that provides a recommendation for selection of a merchant store, in accordance with an embodiment of the disclosure. FIG. 2 is explained in conjunction with elements from FIG. 1. With reference to FIG. 2, there is shown the server 102. The server 102 may comprise one or more circuits, such as a processor 202, a memory 204, and a transceiver 206. The processor 202 may be communicatively coupled to the memory 204 and the transceiver 206.

The processor 202 may comprise suitable logic, circuitry, interfaces, and/or code that may be operable to execute a set of instructions stored in the memory 204. The processor 202 may be implemented based on a number of processor technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The memory 204 may comprise suitable logic, circuitry, and/or interfaces that may be operable to store a machine code and/or a computer program with at least one code section executable by the processor 202. The memory 204 may be configured to store identification information of user, such as the second user 112. The memory 204 may be further configured to store the transaction data of one or more users, such as the second user 112. The memory 204 may be further configured to store the weighted parameters and/or the weights associated with each of the categories and/or the sub-categories of the weighted parameters. Examples of implementation of the memory 204 may include, but are not limited to, Random Access Memory (RAM), Read Only Memory (ROM), Hard Disk Drive (HDD), and/or a Secure Digital (SD) card.

The transceiver 206 may comprise suitable logic, circuitry, interfaces, and/or code that may be operable to communicate with the other servers, via the communication network 108. The transceiver 206 may implement known technologies to support wired or wireless communication of the server 102 with the communication network 108. The transceiver 206 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The transceiver 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as a Global System for Mobile Communications (GSM), Enhanced Data GSM Environment (EDGE), wideband code division multiple access (W-CDMA), code division multiple access (CDMA), time division multiple access (TDMA), Long Term Evolution (LTE), Bluetooth, Wireless Fidelity (Wi-Fi) (e.120 g, IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the processor 202 may be configured to receive a request from the electronic device 104, via the transceiver 206. The request may be received for generation of one or more recommendations for the selection of one or more merchant stores from the plurality of merchant stores. The request may be initiated by the first user 110 by use of the display screen 104a of the electronic device 104.

In accordance with an embodiment, the processor 202 may be configured to receive identification information of the second user 112 as a part of the received request. The identification information may comprise a second user identifier and/or a passkey of the second user 112.

In accordance with an embodiment, based on the received identification information, the processor 202 may be configured to transmit a query to the database server 106, via the transceiver 206. In response to the query, the processor 202 may be configured to receive personal details of the second user 112 stored at the database server 106, via the transceiver 206. The processor 202 may be further configured to compare the received personal details of the second user 112 with the transmitted identification information.

In accordance with an embodiment, when the database server 106 is integrated with the server 102, the processor 202 may be configured to retrieve the personal details of the second user 112 from the memory 204. The processor 202 may be further configured to compare the retrieved personal details of the second user 112 with the received identification information.

In accordance with an embodiment, the personal details may comprise one or more of name, address, email address, phone number, nationality, age, gender, marital status, finger prints, educational history, financial history, employment history, and/or a contact list of the second user 112. The processor 202 may be further configured to determine an association of the second user 112 with the one or more other users, based on the contact list of the second user 112. In accordance with an embodiment, the data that corresponds to the one or more other users associated with the second user 112 may be received from a social networking platform, such as Facebook®, via the transceiver 206. The reception of such data may be based on a JavaScript Object Notation (JSON)®, Extensible Markup Language (XML)®, or the like. Notwithstanding, the disclosure may not be so limited, and the received personal details of the second user 112, may comprise one or more other details, without limiting the scope of the disclosure.

In instances when the identification information is successfully compared with the personal details of the second user 112 at the database server 106, the processor 202 may be configured to transmit the received personal details of the second user 112 to the electronic device 104, via the transceiver 206. In instances of unsuccessful comparison of the identification information and the personal details of the second user 112 at the database server 106, the processor 202 may be configured to transmit a notification to the electronic device 104, via the transceiver 206. The notification message may include textual information, such as "user not found". The transmitted notification may be rendered on the display screen 104a by the electronic device 104.

The processor 202 may be configured to receive input provided by the first user 110, based on the rendered personal details of the second user 112, via the transceiver 206. The received input may correspond to a validation of the rendered personal details of the second user 112, based on the identification information of the second user 112. Based on the successful validation of the second user 112, the processor 202 may be configured to retrieve transaction data of the second user 112 from the database server 106, via the transceiver 206. In accordance with an embodiment, when the transaction data of the second user 112 is stored in the memory 204, the processor 202 may be configured to retrieve the transaction data from the memory 204.

In accordance with an embodiment, the transaction data may correspond to the transaction data explained in detail in FIG. 1. In accordance with an embodiment, the processor 202 may be configured to determine one or more weighted parameters, based on the transaction data of the second user 112. In accordance with an embodiment, the one or more weighted parameters for the second user 112 may be stored in the memory 204. The determined one or more weighted parameters may correspond to one or more categories, such as a first category, a second category, a third category, and a fourth category, explained in detail in FIG. 1. The processor 202 may be further configured to generate one or more recommendations, based on the determined score of each of the one or more categories.

In accordance with an embodiment, the processor 202 may be configured to determine a cumulative score associated with each of the weighted parameters, based on the transaction data of the second user 112. The cumulative score may be determined based on the scores computed for each of the one or more categories, for each of the plurality of merchant stores. The processor 202 may be further configured to generate a rank of the plurality of merchant stores, based on the determined cumulative score for each of the plurality of merchant stores. In accordance with an embodiment, the processor 202 may be configured to generate a rank associated with the one or more merchant stores, based on the preferences received from one or more other users associated with the second user 112.

In accordance with an embodiment, the processor 202 may be configured to retrieve pre-determined criteria for selection of one or more merchant stores, from the memory 204. In accordance with an embodiment, the pre-determined criteria may be based on heuristic analysis of the transaction data of the second user 112. For example, when the gender of the second user 112 is "male", the processor 202 may be configured to select one or more merchant stores that offer products for the corresponding gender.

In accordance with an embodiment, the processor 202 may be configured to select one or more merchant stores based on pre-determined criteria that may include comparison of the determined score with a pre-determined value. The pre-determined value may be stored in the memory 204 and may be customized based on the transaction data of the second user 112. In accordance with an embodiment, the processor 202 may be configured to select merchant stores from the plurality of merchant stores, for which the determined score exceeds the pre-determined value, for generation of customized recommendations. The one or more other merchant stores of the plurality of merchant stores, for which the determined score does not exceed the pre-determined value, may not be selected for generation of the customized recommendations. In accordance with an embodiment, the processor 202 may be configured to exclude the preferred merchant stores of the one or more other users from the selected one or more merchant stores. Such exclusion may be performed to remove duplication when the preferred merchant stores of the one or more other users are same as one or more merchant stores of the plurality of merchant stores. In accordance with an embodiment, the processor 202 may be configured to generate a combined customized recommendation for the one or more other merchant stores.

In accordance with an embodiment, the generated customized recommendation may be a textual recommendation. The customized recommendation may be syntactically constructed based on the determined cumulative score for each of the one or more categories.

In accordance with an embodiment, the processor 202 may be configured to indicate one or more virtual currency instruments associated with generated customized recommendation. The indicated virtual currency instrument may be associated with a merchant store of the one or more merchant stores. In accordance with an embodiment, the processor 202 may be configured to indicate transaction data, such as a preferred merchant store of the second user 112, in the generated customized recommendation. In accordance with an embodiment, the server 102 may be configured to indicate transaction data of the one or more other users, such as a preferred and/or a recommended merchant store, associated with second user 112, in the generated customized recommendation. In accordance with an embodiment, the generated customized recommendation may further indicate one or more alternate merchant stores that may be distinct from the preferred merchant store in the transaction data of the second user 112.

The processor 202 may be configured to transmit the generated rank and/or the customized recommendation to the electronic device 104, via the transceiver 206. The transmitted rank and/or the customized recommendation may be displayed on the display screen 104a, such that the first user 110 may select a field to choose from the one or more recommended merchant stores. The first user 110 may further select the virtual currency and specify a monetary value associated with the selected virtual currency instrument.

In accordance with an embodiment, based on the received virtual currency instrument and/or the specified monetary value, the processor 202 may be configured to issue the received virtual currency instrument of specified monetary value to the second user 112. The processor 202 may be further configured to transmit the issuance information to the database server 106, via the transceiver 206. In accordance with an embodiment, the processor 202 may be configured to update the memory 204, based on the issuance information.

Figure 3:
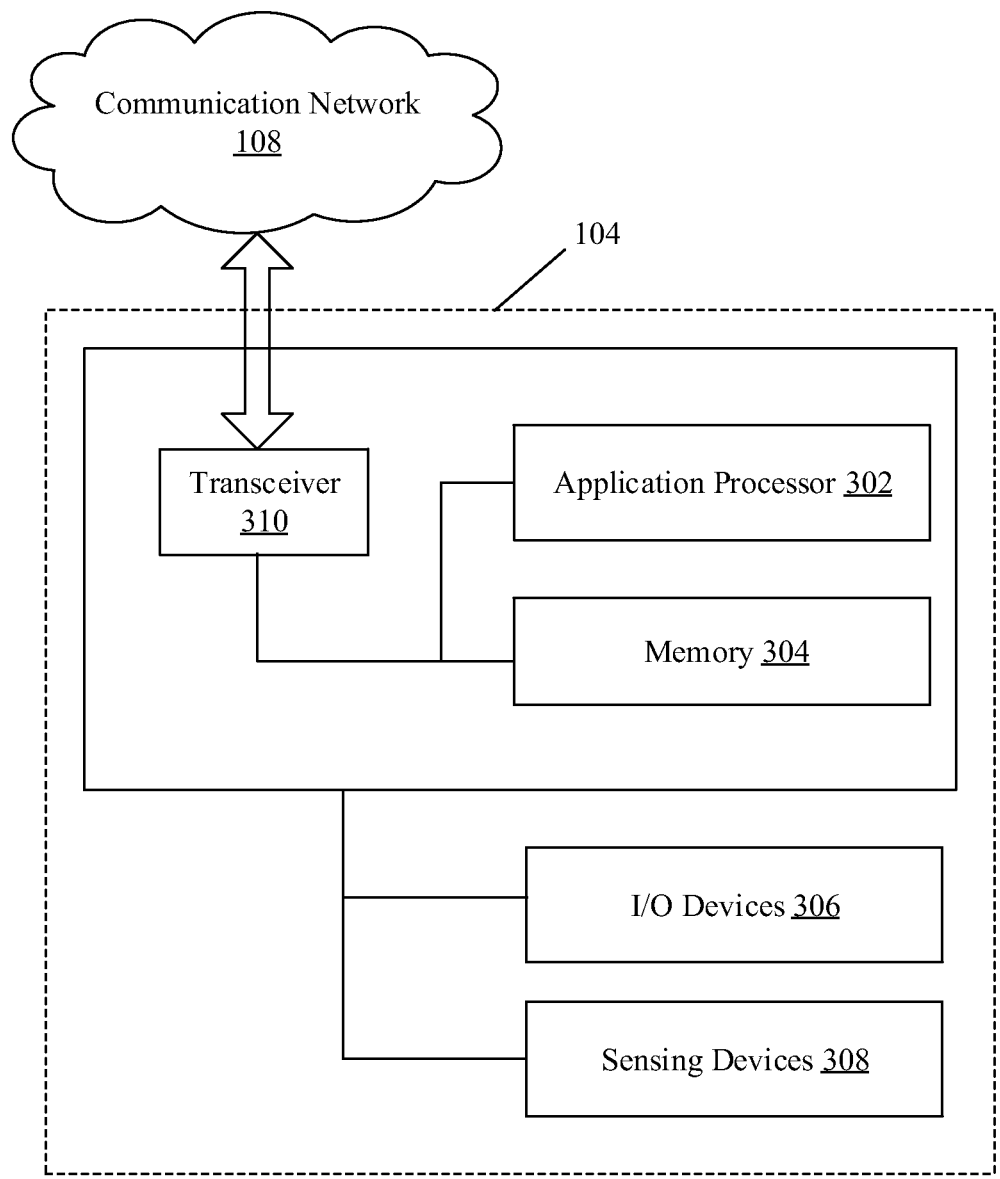
FIG. 3 is a block diagram that illustrates an exemplary electronic device that receives a recommendation for selection of a merchant store, in accordance with an embodiment of the disclosure.

FIG. 3 is a block diagram that illustrates an exemplary electronic device that receives recommendation for selection of a merchant store, in accordance with an embodiment of the disclosure. FIG. 3 is explained in conjunction with elements from FIG. 1 and FIG. 2. With reference to FIG. 3, there is shown the electronic device 104. The electronic device 104 may comprise one or more circuits, such as an application processor 302, a memory 304, input/output (I/O) devices 306, sensing devices 308, and a transceiver 310. The application processor 302 may be communicatively coupled to the memory 304, the I/O devices 306, the sensing devices 308, and the transceiver 310.

The application processor 302 may comprise suitable logic, circuitry, interfaces, and/or code that may be operable to execute a set of instructions stored in the memory 304. The application processor 302 may be implemented based on a number of processor technologies known in the art. Examples of the application processor 302 may be an X86-based processor, a Reduced Instruction Set Computing (RISC) processor, an Application-Specific Integrated Circuit (ASIC) processor, a Complex Instruction Set Computing (CISC) processor, and/or other processors.

The memory 304 may comprise suitable logic, circuitry, and/or interfaces that may be operable to store a machine code and/or a computer program with at least one code section executable by the application processor 302. The memory 304 may be configured to a software application that may facilitate the electronic device 104 to initiate a recommendation request. The memory 204 may be further configured to store the identification information of the first user 110. Examples of implementation of the memory 204 may include, but are not limited to, Random Access Memory (RAM), Read Only Memory (ROM), Hard Disk Drive (HDD), and/or a Secure Digital (SD) card.

The I/O devices 306 may comprise suitable logic, circuitry, interfaces, and/or code that may comprise input devices and output devices. The input devices may be configured to receive recommendation request and identification information from a user, such as the first user 110. The I/O devices 306 may be configured to communicate the received recommendation request and identification information, to the application processor 302. Examples of the input devices may include, but are not limited to, a magnetic card reader, an electronic signature-capture device, a smart card reader, a touch screen, a touch pad, a microphone, and/or a keyboard. The output devices may be operable to provide generated recommendation as one or more output data to the first user 110. Examples of the output devices may include, but are not limited to, a display screen and/or a speaker.

The sensing devices 308 may comprise suitable logic, circuitry, and/or interfaces that may be operable to detect biometric information of one or more users, such as the first user 118. Examples of the sensing devices 308 may include, but are not limited to, a fingerprint scanner, a palm geometry scanner, an iris scanner, and/or a facial scanner. In accordance with an embodiment, the sensing devices 308, such as an electronic signature-capture device and/or a magnetic card reader, may comprise one or more sensors to confirm reception, recognition, identification, and/or verification of the recommendation request and an input to issue a virtual currency instrument. Examples of such one or more sensors may include, but are not limited to, an optic sensor, an image sensor, and/or a magnetic sensor.

The transceiver 310 may comprise suitable logic, circuitry, interfaces, and/or code that may be operable to communicate with the other servers, via the communication network 108. The transceiver 310 may implement known technologies to support wired or wireless communication of the electronic device 104 with the communication network 108. The transceiver 310 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The transceiver 310 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as a Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120 g, IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the sensing devices 308 may be configured to receive identification information of the first user 110. The sensing devices 308 may be further configured to communicate the received identification information of the first user 110 to the application processor 302. The identification information may comprise a first user identifier and/or a passkey of the first user 110. Based on the received identification information, the application processor 302 may be configured to retrieve the personal details of the first user 110 from the memory 304. The application processor 302 may be further configured to authenticate the first user 110, based on the retrieved personal details and the received identification information. In accordance with an embodiment, the authentication of the first user 110 may be based on the identification information received via the I/O devices 306.

The I/O devices 306 may be configured to receive a recommendation request from the authenticated first user 110. In accordance with an embodiment, the first user 110 may provide identification information of the second user 112 to the electronic device 104, via the display screen 104*a*. The identification information may comprise a second user identifier and/or a passkey of the second user 112.

The application processor 302 may be configured to transmit the received identification information to the server 102, via the transceiver 310. In accordance with an implementation, the application processor 302 may process the one or more recommendation requests based on one or more of a voice-based command, a gesture, messaging service, a mobile web payment (WAP), and/or a contactless near field communication (NFC).

In accordance with an embodiment, the application processor 302 may be configured to receive the personal details of the second user 112, based on a successful comparison of the identification information with pre-stored details of second user 112. The I/O devices 306 may be configured to render the received personal details on the display screen 104*a*. In accordance with an embodiment, the I/O devices 306 may be configured to receive input from the first user 110. The input from the first user 110 may correspond to a validation of the rendered personal details of the second user 112. The application processor 302 may be further configured to transmit the received validation input to the server 102, via the transceiver 310.

Based on the successful validation of the personal details of the second user 112, the server 102 may be configured to retrieve the transaction data of the second user 112, from the database server 106. In such a case, the application processor 302 may be configured to receive the transaction data of the second user 112, via the transceiver 310. In instances when the validation of the second user 112 is unsuccessful, the server 102 may be configured to transmit a notification to the electronic device 104. The notification may indicate a failure in identification of the second user 112. In such a case, the I/O devices 306 may be configured to receive a message from the server 102 that indicates a failure in identification of the second user 112. Based on the received message, the I/O devices 306 may be further configured to render the message, such as "User identification failed. Do you want to continue?" on the display screen 104*a*.

In accordance with an embodiment, the validation input may comprise the recommendation request. This may occur when the validation input is provided in response to the successful validation of the personal details of the second user 112. In accordance with an embodiment, the application processor 302 may be configured to transmit the recommendation request to the server 102, based on successful validation of the personal details of the second user 112.

Based on the transmitted recommendation request, a cumulative score from the computed scores for each of the one or more categories, for each of the plurality of merchant stores, may be determined by the server 102. Further, for each of the plurality of merchant stores, a rank of the plurality of merchant stores, based on the determined score, may be generated by the server 102. In accordance with an embodiment, the generated rank associated with the one or more merchant stores may be based on preferences received from one or more other users associated with the second user 112. In accordance with an embodiment, one or more merchant stores may be selected from the plurality of merchant stores by the server 102 based on a pre-determined criteria.

The application processor 302 may be configured to receive the selected one or more merchant stores, the generated customized recommendation, and/or the generated rank, via the transceiver 310. In accordance with an embodiment, the application processor 302 may be further configured to receive the determined score, via the transceiver 310. In accordance with an embodiment, the received customized recommendation may indicate one or more virtual currency instruments associated with the selected one or more merchant stores. In accordance with an embodiment, the received customized recommendation may indicate transaction data of the second user 112. In accordance with an embodiment, the received customized recommendation may indicate transaction data of the one or more other users associated with second user 112. In accordance with an embodiment, the received customized recommendation may indicate one or more alternate merchant stores, which may be distinct from the preferred merchant store in the transaction data of the second user 112. Such alternate merchant stores may correspond to the one or more ranked merchant stores.

The I/O devices 306 may be configured to display the received rank, the determined score, and/or the customized recommendation, via the pre-installed mobile application that may be rendered on the display screen 104a. In accordance with an embodiment, the displayed rank and/or the customized recommendation may comprise a selectable field wherein one or more recommended merchant stores may be chosen. In accordance with an embodiment, the displayed rank and/or the customized recommendation may further comprise a user-selectable option to select the virtual currency associated with the one or more merchant stores. In accordance with an embodiment, the application processor 302 may instruct the I/O devices 306 to display a field to specify a monetary value for the selected virtual currency instrument of the one or more merchant stores.

The I/O devices 306 may be configured to receive a selection of one or more merchant stores, virtual currency instruments associated with the selected merchant store, and/or a monetary value associated with the virtual currency instruments, from the first user 110. The selection may be received via the display screen 104a. In accordance with an embodiment, the selection of the virtual currency instruments and/or the associated monetary value may be based on a voice-based command or a gesture-based input.

In accordance with an embodiment, the application processor 302 may be configured to perform authentication checks on the received selection, based on the personal details of the first user 110, from the received selection. Examples of the basic authorization checks known in the art may include a "first-screening test", a "negative file" check, and/or a "velocity file" check. Based on a successful authentication, the application processor 302 may be configured to transmit the received selection of virtual currency instruments of a selected merchant store, and/or the associated monetary value, to the server 102, via the transceiver 310. Based on the received selection, the server 102 may be configured to issue the selected virtual currency instruments that comprise the monetary value specified by the first user 110, to the second user 112. The transaction data of the second user 112 may be updated in the database server 106, based on the issuance of the virtual currency instrument to the second user 112. In accordance with an embodiment, the I/O devices 306 may be configured to display a notification of successful issuance of the virtual currency instrument to the second user 112.

Figure 4:
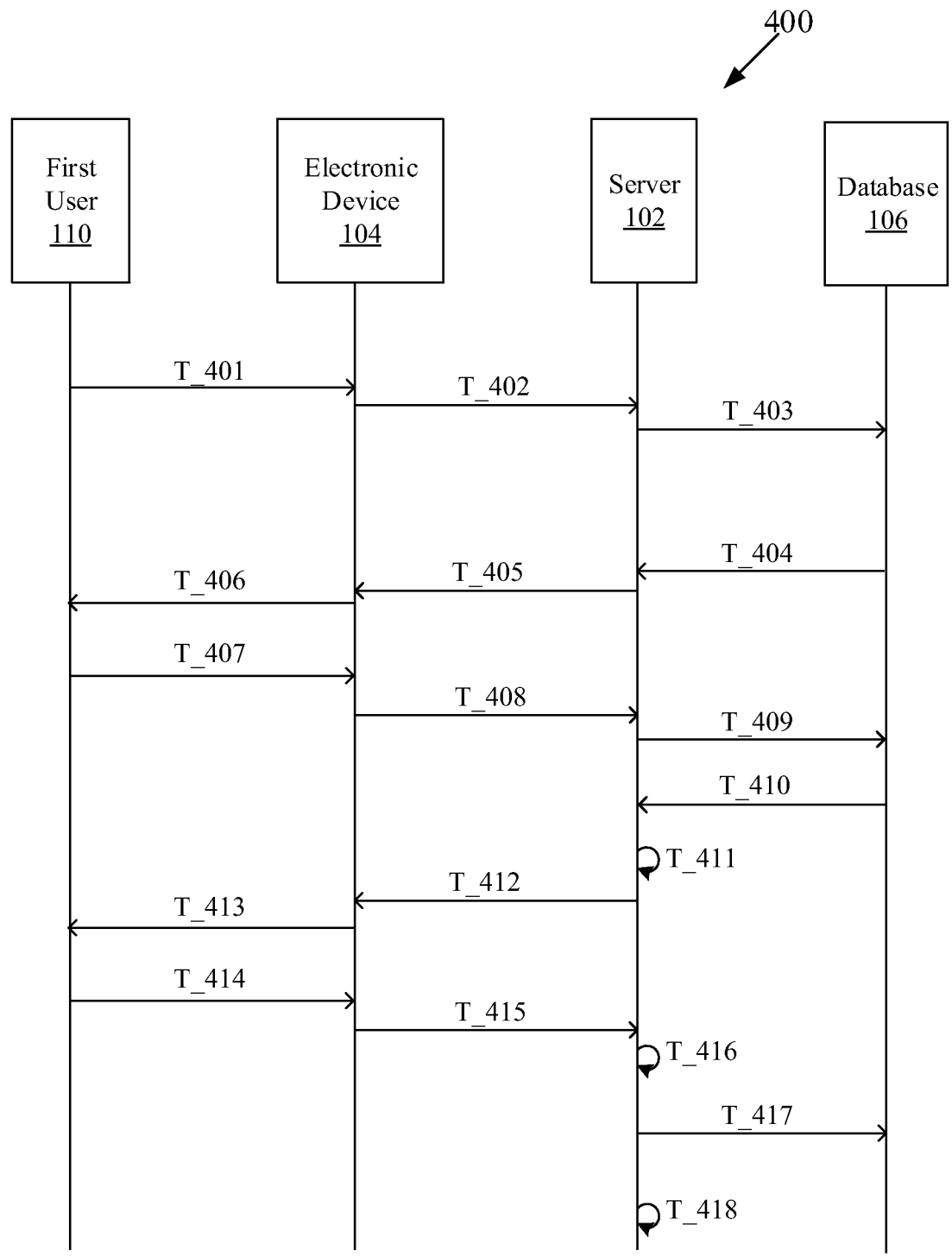
FIG. 4 illustrates an exemplary sequence timing diagram to provide a recommendation for selection of a merchant store and issuance of one or more virtual currency instruments, in accordance with an embodiment of the disclosure.

FIG. 4 illustrates an exemplary sequence timing diagram to provide a recommendation for selection of a merchant store and issuance of one or more virtual currency instruments, in accordance with an embodiment of the disclosure. FIG. 4 is explained in conjunction with elements from FIG. 1. The exemplary sequence timing diagram 400 may include the first user 110, the electronic device 104, the server 102, and the database server 106.

At time "T_401", the first user 110 may initiate a recommendation request. The recommendation request may comprise identification information of the beneficiary, such as the second user 112. At time "T_402" the electronic device 104 may transmit the received recommendation request to the server 102. At time "T_403", the server 102 may transmit the identification information of the second user 112, retrieved from the received recommendation request, to the database server 106 for comparison. At time "T_404", the database server 106 may transmit the comparison result to the server 102. In instances of successful comparison, the database server 106 may transmit personal details of the second user 112 to the server 102. In instances of unsuccessful comparison, the database server 106 may transmit a "user not found" message to the server 102.

At time "T_405", the server 102 may transmit the received personal details to the electronic device 104. At time "T_406" the electronic device 104 may render the received personal details on the display screen 104a, for validation of the received personal details by the first user 110.

At time "T_407", the first user 110 may provide an input that may correspond to a validation of the rendered personal details of the second user 112, based on the identification information, on the display screen 104a. At time "T_408", the electronic device 104 may transmit the validation information to the server 102. In accordance with an embodiment, when the validation input corresponds to a successful validation of the second user 112, a recommendation request may be transmitted to the server 102, along with the validation input. At time "T_409", based on the successful validation of the second user 112 by the first user 110, the server 102 may be configured to retrieve the transaction data of the second user 112, from the database server 106.

At time "T_410", the database server 106 may transmit the transaction data of the second user 112 to the server 102. At time "T_411", based on the transaction data of the second user 112, the server 102 may be configured to determine one or more weighted parameters. In accordance with an embodiment, the server 102 may compute a score associated with each of the weighted parameters, based on the received transaction data of the second user 112. The server 102 may determine a cumulative score from the computed scores for each of the one or more categories, for each of the plurality of merchant stores. The server 102 may further generate a rank of the plurality of merchant stores, based on the determined score for each of the plurality of merchant stores. The server 102 may generate one or more recommendations, based on the determined score of each of the weighted parameters.

In accordance with an embodiment, when a preferred merchant of the second user 112 is received in the transaction data, the server 102 may generate customized recommendation. In such a case, the one or more ranked merchant stores from the plurality of merchant stores may comprise alternate merchant stores.

In accordance with an embodiment, the transaction data of the one or more other users, associated with the second user 112, may comprise a preferred merchant store. In accordance with an embodiment, the server 102 may receive one or more ranked merchant stores associated with the one or more other users. In such cases, the server 102 may indicate the transaction data and/or the received one or more ranked merchant stores, associated with the one or more other users, in the generated customized recommendation. Further, the transaction data and/or the received one or more ranked merchant stores may comprise alternate merchant stores.

In accordance with an embodiment, the server 102 may select one or more merchant stores from the plurality of ranked merchant stores. The selection of the one or more merchant stores may be based on a pre-determined criterion. In accordance with an embodiment, the server 102 may generate a customized recommendation. The customized recommendation may comprise the one or more ranked merchant stores of the one or more other users.

At time "T_412", the server 102 may transmit the selected one or more merchant stores, the generated rank and/or the customized recommendation to the electronic device 104. At time "T_413", the electronic device 104 may render the one or more merchant stores, the generated rank and/or the customized recommendation, on the display screen 104a, for the first user 110. The electronic device 104 may further transmit virtual currency instruments associated with the rendered one or more merchant stores. At time "T_414", the first user 110 may provide a selection of one or more merchant stores, virtual currency instruments associated with the selected one or more merchant stores, and/or a monetary value associated with each of the virtual currency instruments, via the display screen 104a of the electronic device 104.

At time "T_415", the electronic device 104 may transmit the received selection of one or more merchant stores, one or more virtual currency instruments associated with the selected one or more merchant stores, and/or monetary values associated with the one or more virtual currency instruments, to the server 102. At time "T_416", the server 102 may issue the selected one or more virtual currency instruments of the selected one or more merchant stores, to the second user 112. In accordance with an embodiment, the server 102 may further associate the monetary values with the one or more virtual currency instruments. At time "T_417", the information of the issuance of the selected one or more virtual currency instruments, along with the monetary values of the selected one or more virtual currency instruments may be transmitted to the database server 106. At time "T_418", the database server 106 may update the transaction data of the second user 112 based on the issued virtual currency instruments.

Figure 5B:

FIGS. 5A, 5B, and 5C collectively illustrate an exemplary scenario to provide recommendation for selection of a merchant store, in accordance with an embodiment of the disclosure. FIGS. 5A, 5B, and 5C are explained in conjunction with elements from FIG. 1.

With reference to FIG. 5A, there is shown a table 500a that enlists one or more weighted categories in a first column, Weighted Category 502. Each field of the first column, Weighted Category 502, may correspond to one or more weighted sub-categories that are enlisted in a second column, Weighted Sub-category 504.

In accordance with an embodiment, the first column, Weighted Category 502, may comprise one or more weighted categories, such as a frequency of usage 506, an amount used and amount funded 508, a time and location 510, and/or a current value 512. The first weighted category, frequency of usage 506, may correspond to a frequency of usage of each of the plurality of merchant stores by the second user 112. A weighted frequency-based score for the frequency of usage 506 may be determined, based on the transaction history 500b of the second user 112 for a merchant store. The first weighted category, frequency of usage 506, may comprise one or more weighted frequency-based sub-categories 506a, 506b, 506c, and 506d. Each of the weighted frequency-based sub-categories 506a, 506b, 506c, and 506d may be associated with a time-based range. Further, each of the weighted frequency-based sub-categories 506a, 506b, 506c, and 506d may be assigned a weighted frequency-based score.

In accordance with an exemplary scenario, a transaction of the second user 112, which is performed within a first time period, such as "90 days", from the current date, may correspond to the weighted frequency-based sub-category 506a. A weighted frequency-based sub-category score, such as "1", may be assigned to such a transaction. Another transaction of the second user 112, which is performed within a second time period, "90 days to 180 days" from the current date, may correspond to the weighted frequency-based sub-category 506b. A weighted frequency-based sub-category score, such as "0.8", may be assigned to such a transaction. Another transaction of the second user 112, which is performed within a second time period, such as "180 days to 270 days" from the current date, may correspond to the weighted frequency-based sub-category 506c. A weighted frequency-based sub-category score, such as "0.5", may be assigned to the transaction. Another transaction of the second user 112, which is performed within a second time period, "270 days to 360 days" from the current date, may correspond to the weighted frequency-based sub-category 506d. A weighted frequency-based sub-category score, such as "0.25", may be assigned to such a transaction. The server 102 may compute a weighted frequency-based score for frequency of usage 506, based on a summation of weighted frequency-based sub-category scores of each of the frequency-based sub-category 506a, 506b, 506c, and 506d.

The second weighted category, amount used and amount funded 508, may comprise weighted amount-based sub-categories 508a, 508b, and 508c. Each of the weighted amount-based sub-categories 508a, 508b, and 508c, may be associated with the weighted amount-based sub-category score that may correspond to an amount-based range, such as "0 to 12". A weighted amount-based score, for the second weighted category, amount used and amount funded 508, may be determined based on the transaction history 500b of the second user 112 for a merchant store. The amount-based sub-category 508b may correspond to an average of an amount of a monetary value associated with a virtual currency instrument used by the second user 112 at each of the plurality of merchant stores. The weighted amount-based sub-category 508b may correspond to a frequency of funding a virtual currency instrument associated with each of the plurality of merchant stores with a specific amount of monetary value. The weighted amount-based sub-category 508b may correspond to a ratio of a cumulative amount of monetary values associated with the virtual currency instrument spent by the second user 112 at each of the plurality of merchant stores and a cumulative amount of monetary values funded to the virtual currency instrument by second user 112 at each of the plurality of merchant stores.

The third weighted category, time and location 510, may correspond to the location of the plurality of merchant stores with respect to the location of the second user 112. The third weighted category, time and location 510, may further correspond to date and/or time of usage of a virtual currency instrument for a transaction with respect to current date and/or time. The third weighted category, time and location 510, may comprise a weighted location-based sub-category 510a and a weighted time-based sub-category 510b. Each of the weighted location-based sub-category 510a and the weighted time-based sub-category 510b may be assigned the weighted location-based score and a weighted time-based score, respectively, in the range, such as "0-10". In accordance with an exemplary scenario, the weighted location-based sub-category 510a may be associated with a location-based range. Based on the location-based range, a weighted location-based score, such as "6", may be assigned to a transaction that corresponds to a merchant store that is located within a radius, such as "5 miles", from the second user 112. Similarly, a weighted location-based score, such as "4", may be assigned to a transaction that corresponds to a merchant store that is located within a radius, such as "5-20 miles", from the second user 112. Further, a weighted location-based score, such as "2", may be assigned to a transaction that corresponds to a merchant store that is of one of a franchise, or an E-commerce store.

The fourth weighted category, current value 512, may comprise weighted balance-based sub-categories 512a and 512b. Each of the weighted balance-based sub-categories 512a and 512b may be associated with the weighted balance-based sub-category score that may correspond to a balance-based range, such as "0 to 5". The weighted balance-based sub-categories 512a may correspond to balance amount of a monetary value associated with the virtual currency instrument of the plurality of merchant stores, associated with the second user 112. The weighted balance-based sub-categories 512b may correspond to a relative balance of a monetary value associated with the virtual currency instrument associated with the second user 112. The mutually relative balance for the plurality of merchant stores associated with the second user 112 may be determined, for each of the plurality of merchant stores, by the server 102. The weighted balance-based sub-categories 512b may further correspond to a computed ratio of the balance monetary value of the virtual currency instrument to an amount of monetary value funded to the virtual currency instrument. The computed ratio may be inversely proportional to balance monetary value of the virtual currency instrument.

With reference to FIG. 5B, there is shown a transaction history 500b of the second user 112, at each of the plurality of merchant stores. The plurality of merchant stores may comprise instances, such as "Merchant Store A", "Merchant Store B", "Merchant Store C", and "Merchant Store D". Each of the plurality of merchant stores may correspond to a virtual currency instrument. In accordance with an exemplary scenario, the merchant store, "Merchant Store A", may be associated with a virtual currency instrument 514a. The merchant store, "Merchant Store B", may be associated with a virtual currency instrument 514b. The merchant store, "Merchant Store C", may be associated with a virtual currency instrument 514c. The merchant store, "Merchant Store D", may be associated with a virtual currency instrument 514d. The plurality of merchant stores may further comprise "Merchant Store E" and "Merchant Store F" (not shown in FIG. 5B), associated with a virtual currency instrument 514e and a virtual currency instrument 514f, respectively. The merchant store, "Merchant Store E", may correspond to a preferred merchant of the second user 112. The merchant store, "Merchant Store F", may correspond to a preferred merchant of the one or more other users associated with the second user 112.

Further, the merchant store, "Merchant Store A", may be located within a radius, such as "25 miles", from a location of the second user 112. Similarly, the merchant stores, "Merchant Store C" and "Merchant Store D", may be located within radii, such as "5 miles" and "10 miles" respectively, from the location of the second user 112. The merchant stores, "Merchant Store B" and "Merchant Store D", may correspond to E-commerce stores. The merchant store, "Merchant Store C" may correspond to a franchise.

In accordance with an exemplary scenario, the transaction history 500b of the first merchant store, "Merchant Store A", may comprise key fields, such as Date 518a and Balance 520a. The first key field, Date 518a, comprises dates of one or more transactions performed by use of the virtual currency instrument 514a. The second key field, Balance 520a, may comprise monetary values recorded at dates that correspond to the one or more transactions. The monetary values may be prefixed by a plus (+) sign to indicate an amount credited to the virtual currency instrument 514a. The monetary values may be prefixed by a minus (−) sign to indicate an amount debited from the virtual currency instrument 514a.

The transaction history of the other merchant stores, such as "Merchant Store B", "Merchant Store C", and "Merchant Store D". The other merchant stores, such as "Merchant Store B", "Merchant Store C", and "Merchant Store D" may comprise keys fields, Date 518b, Date 518c, and Date 518d, respectively. Further, the other merchant stores, such as "Merchant Store B", "Merchant Store C", and "Merchant Store D" comprise keys fields, Balance 520b, Balance 520c, and Balance 520d, respectively. Further, for each of the merchant stores, "Merchant Store B", "Merchant Store C", and "Merchant Store D", the dates and monetary values may be read in a similar way as explained for the merchant store, "Merchant Store A".

With reference to FIG. 5C, there is shown a table 500c that depicts computation of the cumulative score for each of the one or more weighted categories for the second user 112. FIG. 5C is explained in conjunction with elements from FIGS. 5A and 5B. The table 500c may comprise a first column, Merchant Store 522. The first column, Merchant Store 522, may enlist the plurality of merchant stores, "Merchant Store A", "Merchant Store B", "Merchant Store C", and "Merchant Store D". The first column, Merchant Store 522, may further enlist virtual currency instruments 514a, 514b, 514c, and 514d, associated with the plurality of merchant stores. The table 500c further depicts different columns for each of the one or more weighted categories, Weighted Category 502. Further, for each of the columns of the one or more weighted categories, a computed weighted sub-category score for each of the plurality of merchant stores, "Merchant Store A", "Merchant Store B", "Merchant Store C", and "Merchant Store D", is depicted. The computation of the cumulative score 524 may be based on the weighted sub-category scores, and the transaction history of the second user 112.

In accordance with the exemplary scenario described in FIGS. 5A and 5B, the computations are described herein, for the virtual currency instrument 514a, 514b, 514c, and 514d associated with "Merchant Store A", "Merchant Store B", "Merchant Store C", and "Merchant Store D", respectively.

Further, for the purpose of computation of an exemplary cumulative score, the value of the current date is considered as "12/31/2015".

The computation of the weighted frequency-based score for the first weighted category, frequency of usage 506, may be based on the weighted frequency-based sub-categories 506a, 506b, 506c, and 506d (FIG. 5A) and the transaction history 500b (FIG. 5B). Based on the transaction history 500b, the number of transactions that correspond to weighted frequency-based sub-category 506a, may be "9". Further, number of transactions that correspond to weighted frequency-based sub-category 506b, 506c, and 506d, may be "0". Consequently, for the merchant store, "Merchant Store A", based on the summation of the weighted frequency-based sub-category scores for weighted frequency-based sub-categories 506a, 506b, 506c, and 506d, the weighted frequency-based category scores for the first weighted category, frequency of usage 506, may be "9". Similarly, for other merchant stores, "Merchant Store B", "Merchant Store C", and "Merchant Store D", the weighted frequency-based category scores for weighted frequency of usage 506, may be "4.75", "2.6", and "0.8", respectively.

The computation of the weighted score for the amount used and amount funded 508, may be based on weighted amount-based sub-categories 508a, 508b, and 508c (FIG. 5A) and the transaction history 500b (FIG. 5B). Based on the transaction history 500b, the average of amount of monetary value associated with the virtual currency instrument 514a, used by the second user 112, may be an average of the monetary values that correspond to a used monetary value, prefixed by the minus (−) sign. The average value for the merchant store, "Merchant Store A", may be "$43.5". Similarly, for other merchant stores, "Merchant Store B", "Merchant Store C", and "Merchant Store D", the average values may be "$37.5", "$10.5", and "$0", respectively. The computed average values may be mutually weighted on the amount-based range of "0 to 12". Based on the mutual weighting, a weighted amount-based sub-category score "12" may be computed for the weighted amount-based sub-categories 508a, for the merchant store, "Merchant Store A". Similarly, weighted amount-based sub-category scores "10.34", "2.89", and "0", may be computed for the merchant stores, "Merchant Store B", "Merchant Store C", and "Merchant Store D", respectively.

Based on the transaction history 500b, the weighted amount-based score for the weighted amount-based sub-category 508b may be computed based on the count of transactions for which the virtual currency instrument 514a is funded. Such a count may be determined from the transaction history 500b from the number of monetary values that are prefixed by the plus (+) sign. The weighted amount-based sub-category score for the weighted amount-based sub-category 508b, for the virtual currency instrument 514a of the merchant store, "Merchant Store A", may be "3". Similarly, weighted amount-based sub-category scores for the weighted amount-based sub-category 508b for the merchant stores, "Merchant Store B", "Merchant Store C", and "Merchant Store D, may be "2", "1", and "1", respectively.

Based on the transaction history 500b, the weighted amount-based sub-category score for the weighted amount-based sub-category 508c, for the virtual currency instrument 514a, may be computed based on a ratio of cumulative monetary values. The cumulative monetary values may correspond to the summation of monetary values that indicate a debited monetary value in the transaction history 500b. Such values may be prefixed by the minus (−) sign.

The cumulative monetary values may correspond to the summation of monetary values that indicate a credited monetary value in the transaction history 500b. Such values may be prefixed by the plus (+) sign. The computed ratio for the plurality of merchant stores may be further weighted on the amount-based range of "0 to 12". Based on the above, the weighted amount-based sub-category score for the weighted amount-based sub-category 508c, for the virtual currency instrument 514a of the merchant store, "Merchant Store A", may be "7.4". Similarly, weighted amount-based sub-category score for the weighted amount-based sub-category 508c for the merchant stores, "Merchant Store B", "Merchant Store C", and "Merchant Store D, may be "12", "10.8", and "0", respectively.

Based on the summation of the weighted amount-based sub-category for weighted amount-based sub-categories 508a, 508b, and 508c, for the virtual currency instrument 514a of the merchant store, "Merchant Store A", the weighted amount-based category score may be "22.4". Similarly, for the other merchant stores, "Merchant Store B", "Merchant Store C", and "Merchant Store D", the weighted amount-based category scores for weighted amount-based category 508, may be "24.34", "14.69", and "1", respectively.

The computation of the weighted score for the third weighted category, time and location 510, may be based on the weighted location-based sub-category 510a and weighted time-based sub-category 510b. Based on the transaction history 500b, a location-based score of "2" may be computed for the merchant store, "Merchant Store A", in accordance with the weighted location-based sub-category 510a. For the merchant store, "Merchant Store B", a location-based score of "2" may be computed, based on the type of the merchant store, "Merchant Store B". For the merchant store, "Merchant Store C", a location-based score of "8" may be computed, based on a summation of location-based score, based on the type and location of the merchant store, "Merchant Store C". For the merchant store, "Merchant Store D", a location-based score of "6" may be computed, based on a summation of location-based score, based on the type and location of the merchant store, "Merchant Store D". Further, a time-based score, such as "10", may be computed for the merchant store, "Merchant Store A", based on the proximity of date and/or time of usage of a virtual currency instrument 514a, with respect to current date and/or time. Similarly, weighted time-based scores, "10", "6", and "0", may be computed for the other merchant stores, "Merchant Store B", "Merchant Store C", and "Merchant Store D", respectively.

Based on the summation of the weighted location-based score and weighted time-based score for the virtual currency instrument 514a of the merchant store, "Merchant Store A", the weighted score for the third weighted category, time and location 510, may be "12". Similarly, for the other merchant stores, "Merchant Store B", "Merchant Store C", and "Merchant Store D", the weighted scores for weighted time and location 510, may be "12", "14", and "6", respectively.

The computation of the weighted score for the fourth weighted category, current value 512, may be based on the weighted balance-based sub-categories 512a and 512b. Based on the transaction history 500b, the key fields, Balance 520a, 520b, 520c, and 520d, associated with the virtual currency instruments 514a, 514b, 514c, and 514d, respectively, may be determined. The determined key fields, Balance 520a, 520b, 520c, and 520d, may be mutually weighted on the balance-based range, "0 to 5", in accordance with the weighted balance-based sub-category 512a. Based on the mutual weighting, the weighted first balance-based sub-category score for the virtual currency instrument 514a of the merchant store, "Merchant Store A", may be "5". Similarly, the weighted first balance-based sub-category scores for the merchant stores, "Merchant Store B", "Merchant Store C", and "Merchant Store D", may be "0", "0.12", and "3.05", respectively.

In accordance with the weighted balance-based sub-category 512b, a weighted second balance-based sub-category score may be computed. The weighted second balance-based sub category score may be based on the key fields, Balance 520a, 520b, 520c, and 520d, and the amount of monetary value funded to the virtual currency instrument 514a. The amount of monetary value funded to the virtual currency instrument 514a may be a summation of all the monetary values in the transaction history 500b that are prefixed with the plus (+) sign. The weighted second balance-based sub-category score for the virtual currency instrument 514a of the merchant store, "Merchant Store A", may be a ratio of the key field, Balance 520a and the funded monetary value "$425". The determined ratio may be weighted on a balance-based range of "0 to 5". The weighted ratio may be then subtracted from a value "5" to compute the second balance-based score. Such a subtraction indicates an inversely proportional relationship of the weighted second balance-based sub-category score, to the key field, Balance 520a, of the virtual currency instrument 514a. Based on the weighting, the weighted second balance-based sub-category score for the virtual currency instrument 514a of the merchant store, "Merchant Store A", may be "3.1". Similarly, the weighted second balance-based sub-category scores for the other merchant stores, "Merchant Store B", "Merchant Store C", and "Merchant Store D", may be "5", "4.2", and "0", respectively.

Based on the summation of the weighted scores for the weighted balance-based sub-category 512a and 512b for the virtual currency instrument 514a of the merchant store, "Merchant Store A", the weighted second balance-based category score for current value 512, may be "8.1". Similarly, for the merchant stores, "Merchant Store B", "Merchant Store C", and "Merchant Store D", the weighted balance-based category scores for the current value 512, may be "5", "4.22", and "3.05", respectively The computation of the cumulative score 524 for the virtual currency instrument 514a of the merchant store, "Merchant Store A", may be based on a summation of the computed cumulative weighted score for each of the one or more weighted categories. The cumulative score 524 for the virtual currency instrument 514a of the merchant store, "Merchant Store A", may be "51.5". Similarly, cumulative score 524 for the virtual currency instruments of the other merchant stores, "Merchant Store A", "Merchant Store B", "Merchant Store C", and "Merchant Store D", may be "46.09", "35.51", and "10.85", respectively.

Figure 6A:
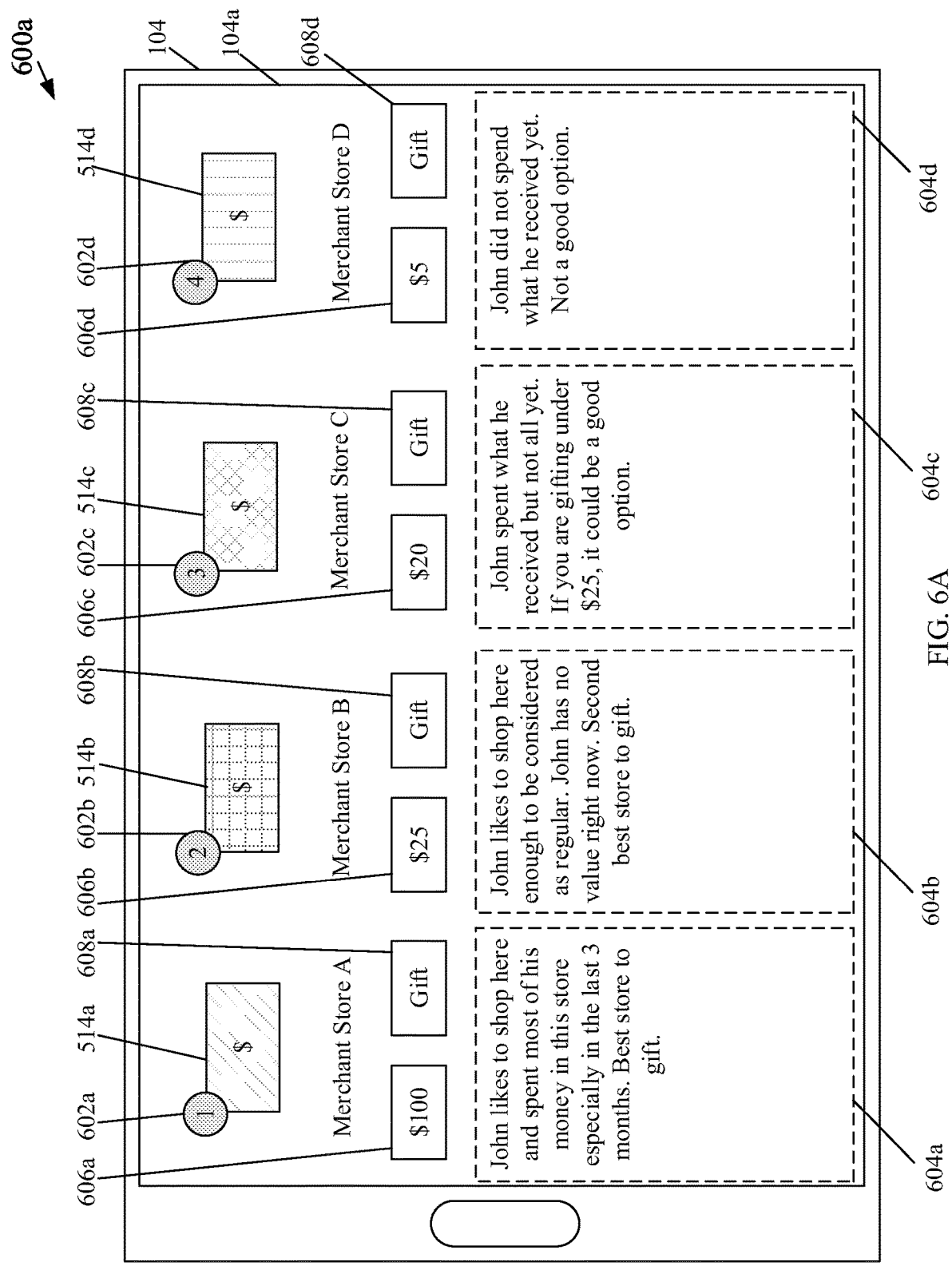
FIGS. 6A, 6B, and 6C illustrate a first, a second, and a third exemplary user interface of an electronic device that receives a recommendation for selection of a merchant store, in accordance with an embodiment of the disclosure.
Figure 6B:
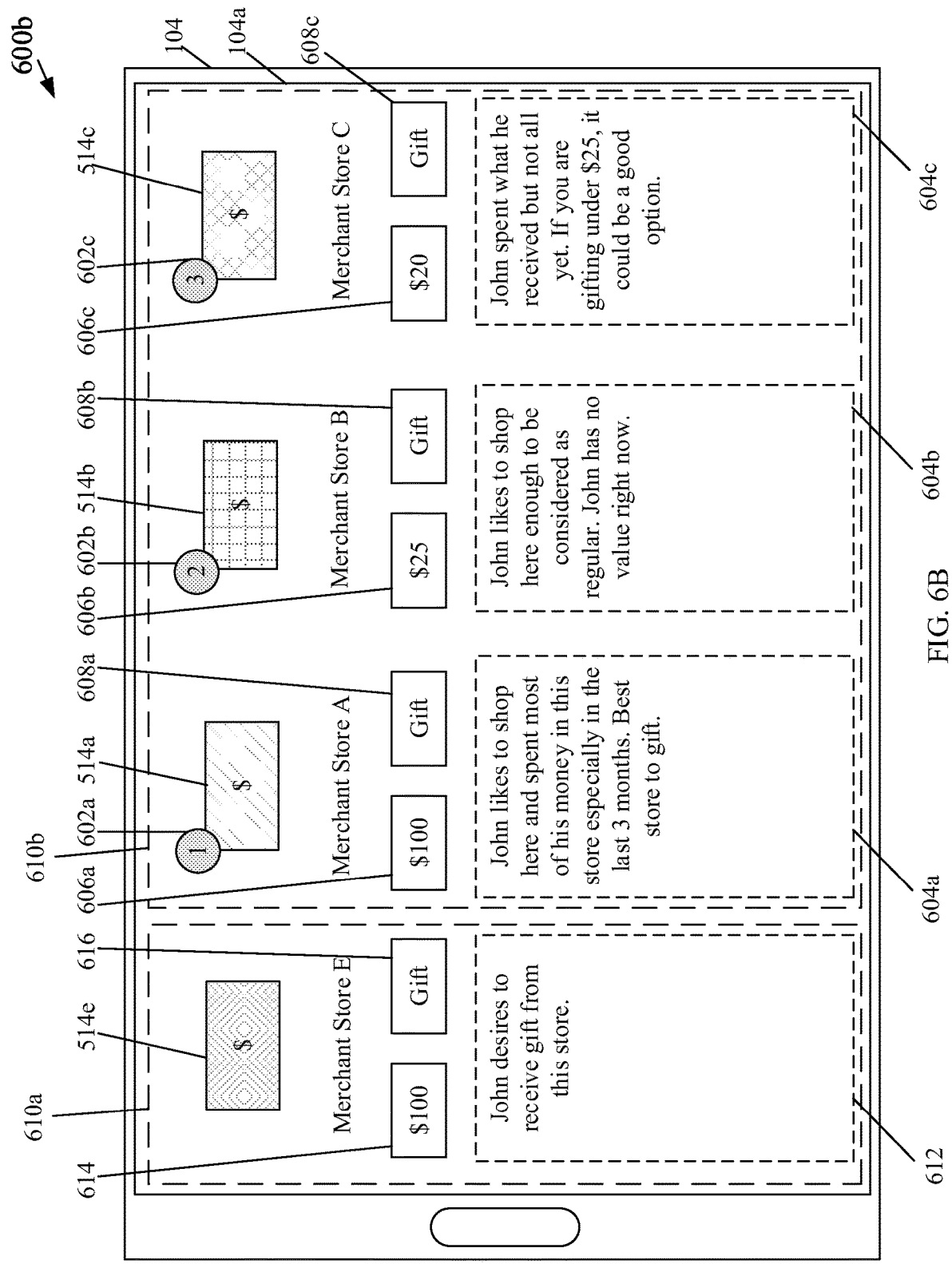
Figure 6C:
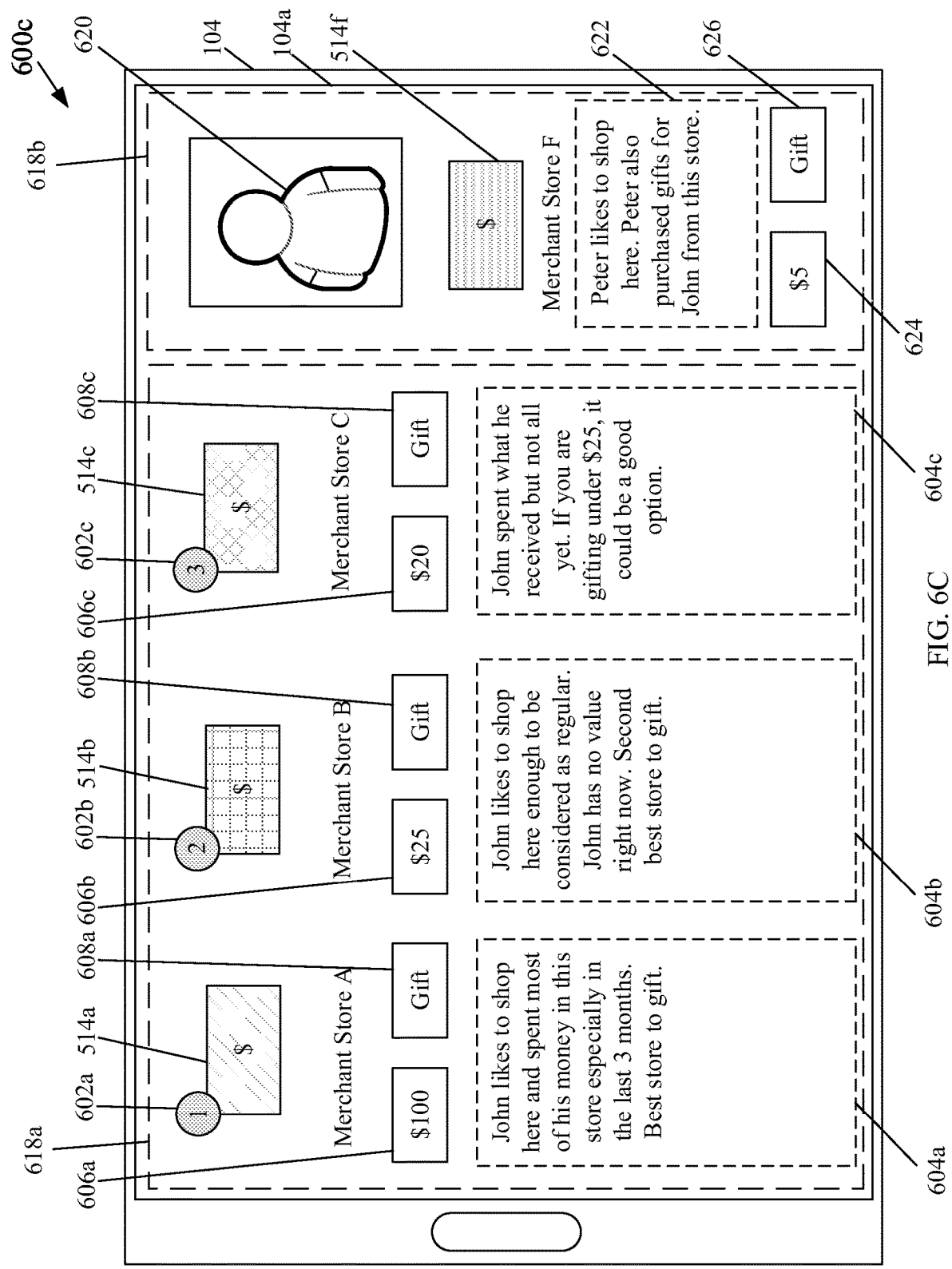

FIGS. 6A, 6B, and 6C collectively illustrate first, second, and third exemplary user interfaces of an electronic device that receives recommendation for selection of a merchant store. FIGS. 6A, 6B, and 6C are explained in conjunction with elements from FIG. 1, FIG. 2, and FIGS. 5A to 5C.

With reference to FIG. 6A, there is shown an exemplary first user interface 600a rendered on the display screen 104a of the electronic device 104. The exemplary first user interface 600a may depict the virtual currency instruments 514a, 514b, 514c, and 514d of the merchant stores, "Merchant Store A", "Merchant Store B", "Merchant Store C", and "Merchant Store D", respectively. The exemplary first user interface 600a may further depict customized recommendations for the one or more merchant stores in the portions 604a, 604b, 604c, and 604d, of the display screen 104a. The exemplary first user interface 600a may further depict graphical user interface (GUI) elements, such as 606a, 606b, 606c, and 606d. The exemplary first user interface 600a may further depict user selectable buttons, such as 608a, 608b, 608c, and 608d.

In accordance with an exemplary scenario, the first user interface 600a may depict ranks, such as 602a, 602b, 602c, and 602d. Each rank may correspond to a virtual currency instrument of the virtual currency instruments 514a, 514b, 514c, and 514d. More specifically, the rank 602a may correspond to "Merchant Store A", the rank 602b may correspond to "Merchant Store B", the rank 602c may correspond to "Merchant Store C", and the rank 602d may correspond to "Merchant Store D". Such one or more merchant stores may be selected from the plurality of merchant stores based on pre-defined criteria. Such ranks may be indicative of a preference in recommendation for selection of one or more merchant stores. The server 102 may be configured to determine the ranks 602a, 602b, 602c, and 602d, based on the computed cumulative scores for each of the plurality of merchant stores, as described in FIG. 5C. In accordance with an instance of the exemplary scenario, the ranks 602a, 602b, 602c, and 602d, may correspond to values, "1", "2", "3", and "4", respectively. In an exemplary scenario, when one or more merchant stores of the plurality of merchants are ranked with a same value, the server 102 may refer to the cumulative scores of the one or more weighted categories to break the tie.

In accordance with an instance of the exemplary scenario, the server 102 may be configured to generate customized recommendations for the one or more merchant stores, based on the computed cumulative score and generated ranks. In an instance, the generated customized recommendation may correspond to a textual recommendation. In an exemplary scenario, the customized recommendation for the merchant store, "Merchant Store A", may be, "John likes to shop here and spent most of his money in this store especially in the last 3 months. Best store to gift." The words, such as "best", of the text in the generated customized recommendation may be selected in real time based on the generated rank of a merchant store of the one or more merchant stores. Such a selection may be made from a repository of keywords present in the memory 204 of the server 102. As the merchant store, "Merchant Store B", is ranked below the merchant store, "Merchant Store A", the generated customized recommendation for the merchant store, "Merchant Store B", may be, "John likes to shop here enough to be considered as regular. John has no value right now. Second best store to gift." Similarly, the generated customized recommendation for the merchant store, "Merchant Store B", may be, "John spent what he received but not all yet. If you are gifting under $25, it could be a good option." As the merchant store, "Merchant Store D", is the least ranked store, therefore the generated customized recommendation for the merchant store, "Merchant Store D", may be, "John did not spend what he received yet. Not a good option."

The GUI elements 606a, 606b, 606c, and 606d may be used to specify a monetary value for a virtual currency instrument of each of the one or more merchant stores. Based on the user selectable buttons 608a, 608b, 608c, and 608d, the first user 110 may generate a request to issue the virtual currency instrument that corresponds to the merchant store, associated with the second user 112.

With reference to FIG. 6B, there is shown an exemplary second user interface 600b rendered on the display screen 104a of the electronic device 104. The exemplary second user interface 600b may correspond to a scenario when the transaction data of the second user 112 comprises a preferred merchant store. In accordance with an exemplary scenario, the preferred merchant store of the second user 112 may correspond to the merchant store, "Merchant Store E" (as described in FIG. 5A).

In accordance with an instance of the exemplary scenario, the second user interface 600b may comprise regions 610a and 610b. The region 610a may correspond to the preferred merchant store, such as the merchant store, "Merchant Store E". The region 610a may further depict the virtual currency instrument 514e associated with the merchant store, "Merchant Store E". The server 102 may generate customized recommendation for the merchant store, "Merchant Store E". The customized recommendation may correspond to the text, "John desires to receive gift from this store." that may be rendered in the region 612 of the region 610a.

In accordance with an instance of the exemplary scenario, the region 610a may further depict a GUI element 614 that may be used to specify a monetary value for a virtual currency instrument 514e of the merchant store, "Merchant Store E". The region 610a may further depict user selectable button 616 based on which, the first user 110 may generate a request for issuance of a virtual currency instrument 514e of the merchant store, "Merchant Store E", to the second user 112.

The region 610b may correspond to the selected one or more merchant stores, such as "Merchant Store A", "Merchant Store B", and "Merchant Store C". The region 610b may depict the virtual currency instruments 514a, 514b, and 514c of the merchant stores, "Merchant Store A", "Merchant Store B", and "Merchant Store C", respectively. For each of the one or more merchant stores, the region 610b may depict the determined ranks 602a, 602b, and 602c (as described in FIG. 6A). The region 610b may further depict generated customized recommendation in the portions 604a, 604b, and 604c (as described in FIG. 6A). The region 610b may further depict GUI elements 606a, 606b, and 606c that may be used to specify a monetary value for a virtual currency instrument (as described in FIG. 6A). The region 610b may further depict user selectable buttons 608a, 608b, and 608c based on which, the first user 110 may generate a request for issuance of one or more virtual currency instruments to the second user 112 (as described in FIG. 6A).

With reference to FIG. 6C, there is shown an exemplary third user interface 600c rendered on the display screen 104a of the electronic device 104. The exemplary third user interface 600c may correspond to a scenario when the transaction data of the one or more other users, such as a user 620, associated with the second user 112 comprises a preferred merchant store. In accordance with an exemplary scenario, the preferred merchant store of the user 620 may correspond to the merchant store, "Merchant Store F" (as described in FIG. 5A).

In accordance with an instance of the exemplary scenario, the third user interface 600c may comprise regions 618a and 618b. The region 618a corresponds to the selected one or more merchant stores, such as "Merchant Store A", "Merchant Store B", and "Merchant Store C". The region 618a may depict the virtual currency instruments 514a, 514b, and 514c of the merchant stores, "Merchant Store A", "Merchant Store B", and "Merchant Store C", respectively. For each of the one or more merchant stores, the region 618a may depict the generated customized recommendation in the portion 604a, 604b, and 604c (as described in FIG. 6A). The region 618a may further depict GUI elements 606a, 606b, and 606c that may be used to specify a monetary value for a virtual currency instrument (as described in FIG. 6A). The region 618a may further depict user selectable buttons 608a, 608b, and 608c based on which, the first user 110 may generate a request for issuance of one or more virtual currency instruments to the second user 112 (as described in FIG. 6A).

The region 618b may correspond to the preferred merchant store, such as the merchant store, "Merchant Store F". The region 618b may further depict the virtual currency instrument 514f associated with the "Merchant F". The server 102 may generate customized recommendation for the merchant store, "Merchant Store F". In accordance with an instance of the exemplary scenario, the name of the user 620 may be "Peter". The customized recommendation may correspond to the text, "Peter likes to shop here. Peter also purchased gifts for John from this store", that may be rendered in the region 622 of the region 618b. In accordance with an instance of the exemplary scenario, the region 618b may further depict a GUI element 624 that may be used to specify a monetary value for a virtual currency instrument 514f of the merchant store, "Merchant Store F". The region 618b may further depict user selectable button 626 based on which, the first user 110 may generate a request for issuance of a virtual currency instrument 514f of the merchant store, "Merchant Store F" to the second user 112.

Figure 7A:
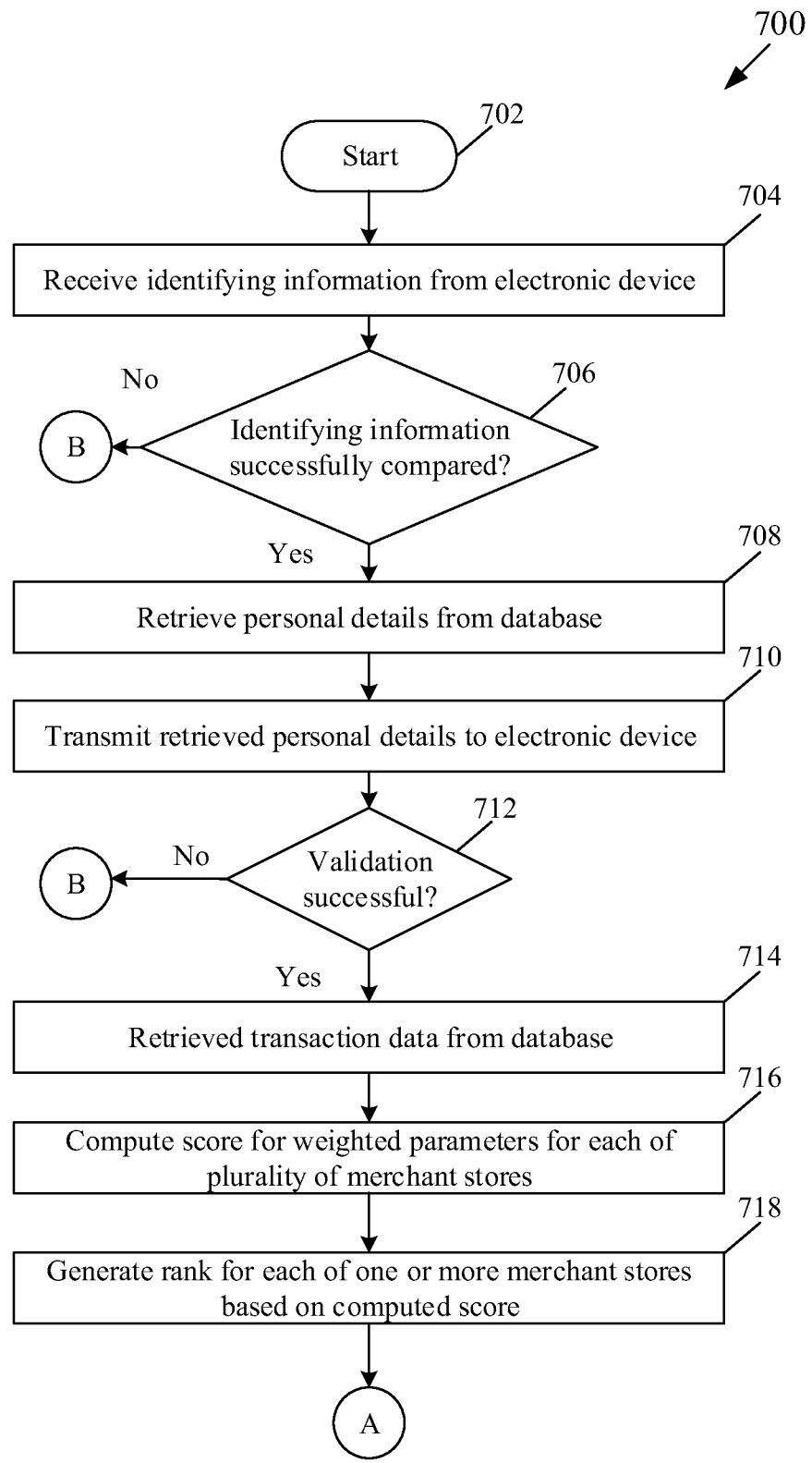
FIGS. 7A and 7B collectively depict a first flowchart that illustrates a method implemented at the server that provides a recommendation for selection of one or more merchant stores, in accordance with an embodiment of the disclosure.
Figure 7B:
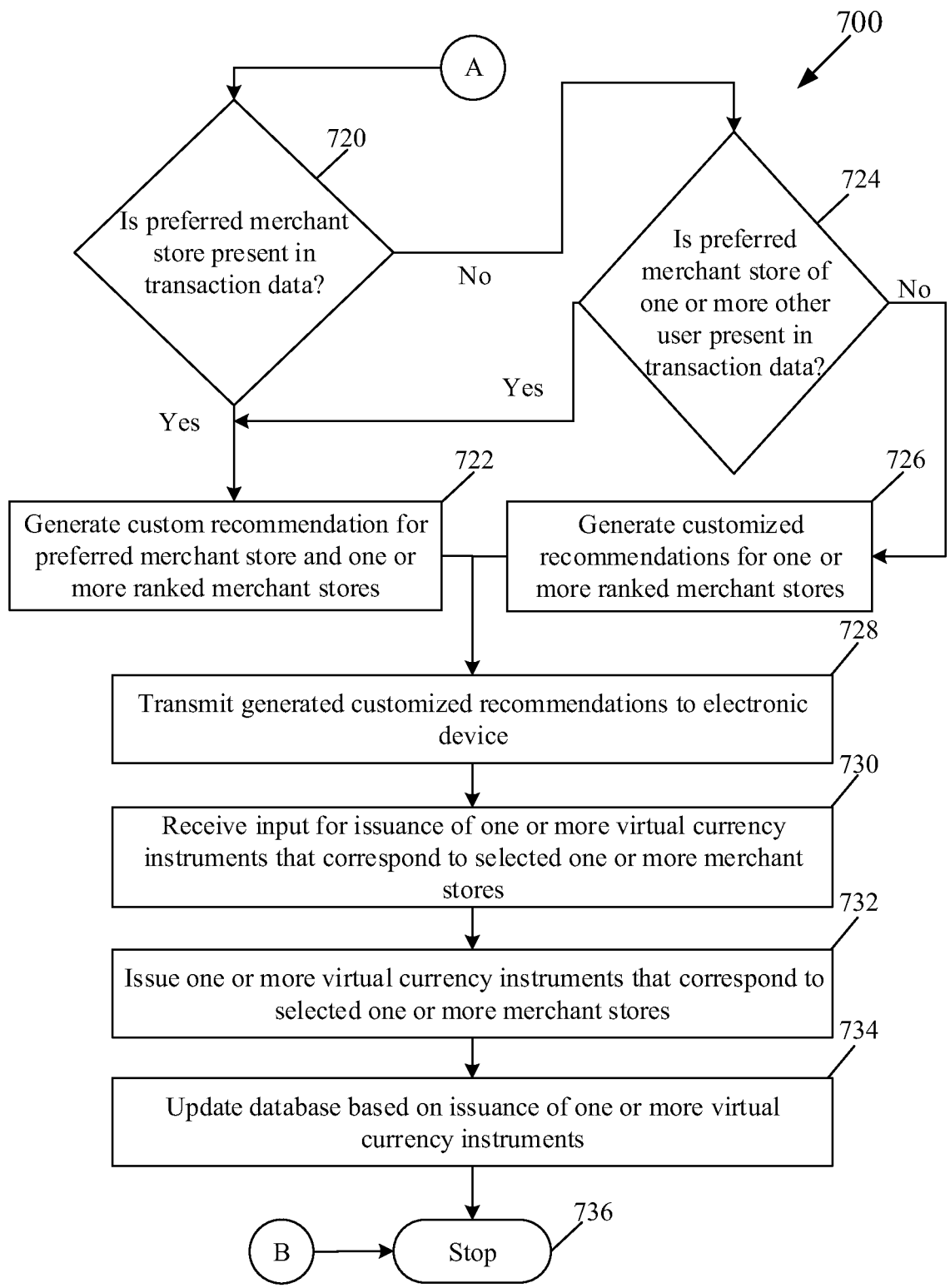

FIGS. 7A and 7B collectively depict a first flowchart that illustrates a method implemented at the server that provides recommendation for selection of one or more merchant stores, in accordance with an embodiment of the disclosure. With reference to FIG. 7 there is shown a flowchart 700. The flowchart 700 may correspond to a method that may be implemented in the server 102. The flowchart 700 is described in conjunction with FIG. 1. The method starts at step 702 and proceeds to step 704.

At step 704, identification information that corresponds to the second user 112 may be received from the electronic device 104 by the server 102. The identification information may be provided to the electronic device 104, by the first user 110. At step 706, it may be determined whether the received identification information is successfully compared with the pre-stored details of the second user 112. In instances when the comparison is successful, the control passes to step 708. In instances when the comparison is not successful, the control passes to end step 736.

At step 708, the personal details of the second user 112 may be retrieved from the database server 106. At step 710, the retrieved details of the second user 112 may be transmitted for validation to the electronic device 104. At step 712, it may be determined whether the validation of the personal details of the second user 112 is successful. In instances, when the validation of the personal details of the second user 112 is successful, the control passes to step 714. In instances, when the validation of the personal details of the second user 112 is not successful, the control passes to end step 736.

At step 714, the transaction data of the second user 112 may be retrieved from the database server 106. At step 716, based on the retrieved transaction data, score for each of the weighted parameters may be computed, for each of the plurality of merchant stores associated with the second user 112. At step 718, a rank for each of one or more merchant stores may be generated, based on the computed score. At step 720, it may be determined whether a preferred merchant store is present for the second user 112. In instances when the preferred merchant store is present, the control passes to step 722. In instances when the preferred merchant store is not present, the control passes to step 724.

At step 722, custom recommendation may be generated for the preferred merchant store and the one or more ranked merchant stores. The ranked merchant stores may correspond to one or more alternative merchant stores. The control passes to step 728.

At step 724, it may be determined whether one or more preferred and/or ranked merchant stores are present for one or more other users associated with the second user 112. In instances when one or more preferred and/or ranked merchant stores are present for one or more other users associated with the second user 112, the control passes to step 722. In instances when one or more preferred and/or ranked merchant stores are not present for one or more other users associated with the second user 112, the control passes to step 726.

At step 726, customized recommendations for one or more ranked merchant stores may be generated. At step 728, the generated customized recommendations may be transmitted to the electronic device 104. At step 730, an input for issuance of one or more virtual currency instruments that correspond to the selected one or more merchant stores, may be received from the electronic device 104. The input for issuance of one or more virtual currency instruments that correspond to the selected one or more merchant stores, may be provided to the electronic device 104 by the first user 110.

At step 732, the one or more virtual currency instruments that correspond to the selected one or more merchant stores may be issued to the second user 112. At step 734, the transaction data of the second user 112 may be updated in the database based on the issuance of the one or more virtual currency instruments. The control passes to the end step 736.

Figure 8A:
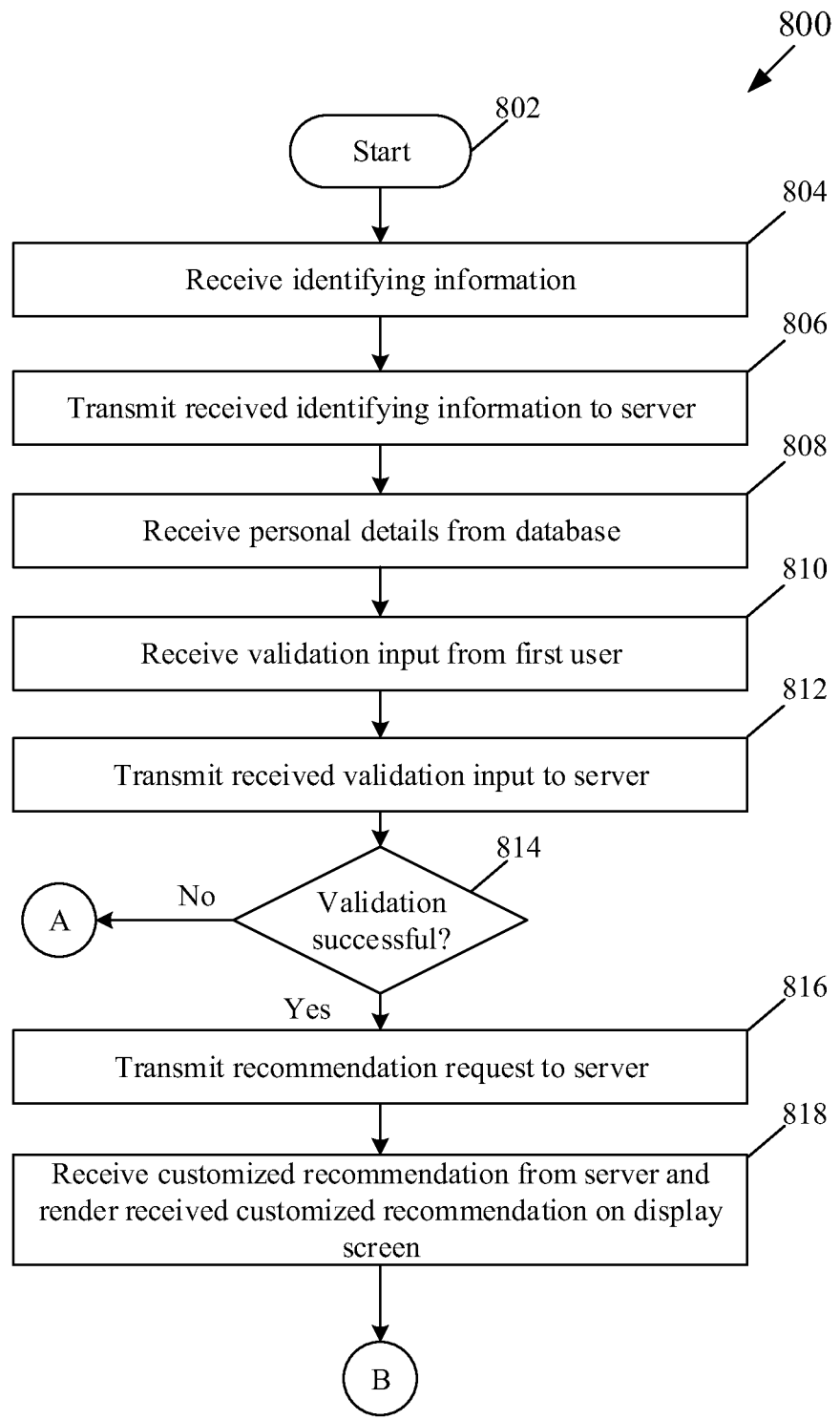
FIGS. 8A and 8B collectively depict a second flowchart that illustrates another method implemented at the electronic device that receives a recommendation for selection of one or more merchant stores, in accordance with an embodiment of the disclosure.
Figure 8B:
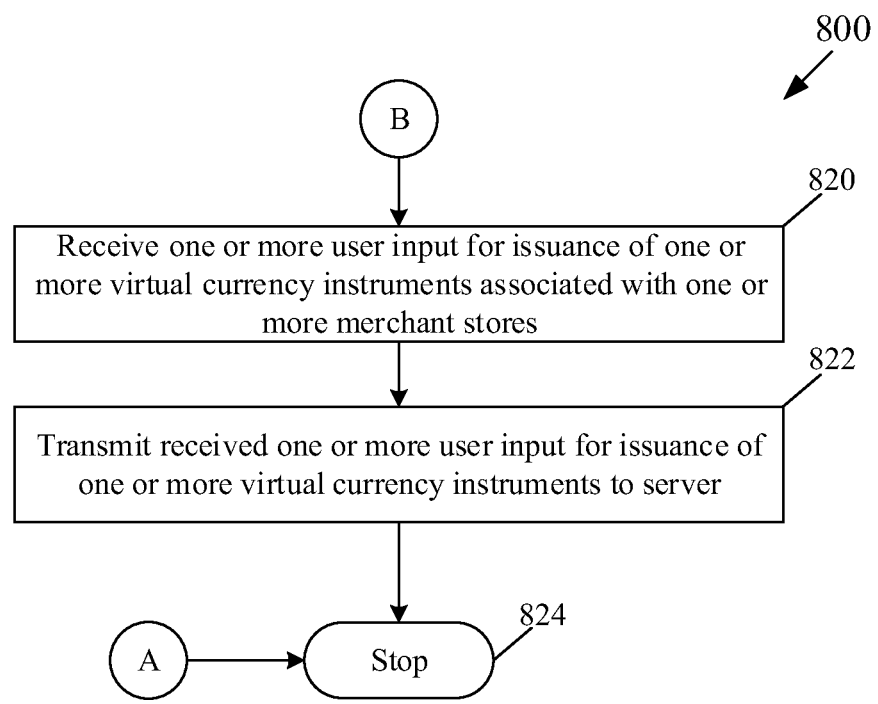

FIGS. 8A and 8B collectively depict a second flowchart that illustrates another method implemented at the electronic device that receives recommendation for selection of one or more merchant stores, in accordance with an embodiment of the disclosure. With reference to FIG. 8 there is shown a flowchart 800. The flowchart 800 may correspond to a method that may be implemented in the electronic device 104. The flowchart 800 is described in conjunction with FIG. 1. The method starts at step 802 and proceeds to step 804.

At step 804, identification information that corresponds to the second user 112 may be received by the electronic device 104. At step 806, the received identification information may be transmitted to the server 102. At step 808, personal details of the second user 112 may be received based on a successful comparison of the transmitted identification information with the pre-stored details of the second user 112 at the database server 106 or the server 102. At step 810, a validation input that corresponds to the received personal details of the second user 112, may be received from the first user 110. At step 812, the received validation input may be transmitted to the server 102.

At step 814, the result of the validation may be received from the server 102. It may be determined whether the received result corresponds to a successful validation of the personal details of the second user 112. In instances, when the received result corresponds to a successful validation of the personal details of the second user 112, the control passes to step 816. In instances when the received result corresponds to an unsuccessful validation of the personal details of the second user 112, the control passes to end step 824.

At step 816, a recommendation request may be transmitted to the server 102 to generate recommendation for selection of one or more merchant store associated with the second user 112. At step 818, a customized recommendation may be received from the server 102. The received customized recommendations may be rendered on the display screen 104a. At step 820, one or more user input for issuance of one or more virtual currency instruments associated with the one or more merchant stores, may be received from the first user 110. At step 822, the received one or more user input for issuance of one or more virtual currency instruments may be transmitted to the server 102. The control passes to end step 824.

In accordance with an embodiment of the disclosure, a system to provide a recommendation for selection of a merchant store may comprise one or more circuits, such as the processor 202 (FIG. 2), in the server 102. The processor 202 may be configured to receive a recommendation request for selection of one or more merchant stores from a plurality of merchant stores. The recommendation request may be associated with a beneficiary. The processor 202 may be further configured to determine a score associated with each of the plurality of merchant stores based on a plurality of weighted parameters associated with the beneficiary. The processor 202 may be further configured to generate a recommendation for the selection of the one or more merchant stores based on the determined score associated with each of the plurality of merchant stores.

In accordance with another aspect of the present disclosure, the system to provide a recommendation for selection of a merchant store may comprise one or more circuits, such as the application processor 302 (FIG. 3), in the electronic device 104. The application processor 302 may be configured to transmit information associated with a beneficiary to a server 102. The application processor 302 may be further configured to receive identification information that corresponds to the beneficiary from the server 102. The application processor 302 may be further configured to transmit a recommendation request to the server 102 for selection of one or more merchant stores from a plurality of merchant stores. The recommendation request may be associated with the beneficiary. The application processor 302 may be further configured to receive a customized recommendation for each of the one or more merchant stores based on a score associated with each of the plurality of merchant stores. The score associated with each of the plurality of merchant stores may be determined based on a plurality of weighted parameters associated with the beneficiary.

Various embodiments of the disclosure may provide a non-transitory computer readable medium and/or storage medium, a machine code and/or a computer program having at least one code section executable by a machine and/or a computer to provide recommendation for selection of a merchant store. The at least one code section, in a server, may cause the machine and/or computer to perform the steps that comprise reception, by the server 102, of a recommendation request for selection of one or more merchant stores from a plurality of merchant stores. The recommendation request is associated with a beneficiary. The steps may further include determination, at the server 102, of a score associated with each of the plurality of merchant stores based on a plurality of weighted parameters associated with the beneficiary. The steps may further include generation, at the server 102, of a recommendation for the selection of the one or more merchant stores based on the determined score associated with each of the plurality of merchant stores.

In accordance with another aspect of the present disclosure, various embodiments of the disclosure may provide a non-transitory computer readable medium and/or storage medium, having stored thereon, a machine code and/or a computer program having at least one code section executable by a machine and/or to provide recommendation for selection of a merchant store. The at least one code section, in an electronic device 104, may cause the machine and/or computer to perform the steps that include transmission, by the electronic device 104, of information associated with a beneficiary to the server 102. The steps may further include reception, by the electronic device 104, of identification information that corresponds to the beneficiary. The identification information may be received from the server 102. The steps may further include transmission, by the electronic device 104, of a recommendation request to the server 102 for selection of one or more merchant stores from a plurality of merchant stores. The recommendation request may be associated with the beneficiary. The steps may further include reception, by the electronic device 104, of a customized recommendation for each of the one or more merchant stores based on a score associated with each of the plurality of merchant stores. The score associated with each of the plurality of merchant stores may be determined based on a plurality of weighted parameters associated with the beneficiary.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
   receiving, at a server, a recommendation request from a user, wherein
      said recommendation request is for selection of at least one merchant store from a plurality of merchant stores,
      said recommendation request is associated with a beneficiary, and
      said user is different from said beneficiary;
   determining, at said server, a ratio of a first cumulative amount of monetary values spent by said beneficiary at each of said plurality of merchant stores to a second cumulative amount of monetary values added to a first virtual currency instrument by said beneficiary at each of said plurality of merchant stores,
      wherein said first cumulative amount of monetary values are associated with said first virtual currency instrument;
   determining, at said server, an average of amount of monetary values spent by said beneficiary for each transaction at each of said plurality of merchant stores;
   determining, at said server, a score associated with each of said plurality of merchant stores, based on a plurality of weighted parameters that includes a summation of said determined ratio and said determined average of said amount of monetary values,
      wherein said plurality of weighted parameters is associated with said beneficiary;
   generating, at said server, a recommendation of said at least one merchant store for said selection of said at least one merchant store based on said determined score associated with each of said plurality of merchant stores;
   controlling a display screen, of an external device of said user, to display said at least one merchant store for said selection of said at least one merchant store;
   issuing a second virtual currency instrument associated with said selected at least one merchant store to said beneficiary; and
   notifying said beneficiary of said issuance of said second virtual currency instrument associated with said selected at least one merchant store to said beneficiary.

2. The method according to claim 1, wherein said plurality of weighted parameters comprises a frequency of usage of each of said plurality of merchant stores by said beneficiary.

3. The method according to claim 1, wherein said plurality of weighted parameters comprises at least one of
   an amount of monetary value spent by said beneficiary at each of said plurality of merchant stores, wherein said amount of monetary value is associated with said first virtual currency instrument, or
   a frequency of funding said first virtual currency instrument associated with each of said plurality of merchant stores.

4. The method according to claim 1, wherein said plurality of weighted parameters comprises at least one of a proximity of each of said plurality of merchant stores to a location of said beneficiary, one of a date or a time of usage of said first virtual currency instrument associated with each of said plurality of merchant stores or a type of each of said plurality of merchant stores.

5. The method according to claim 1, wherein said plurality of weighted parameters comprises at least one of a balance amount of said first virtual currency instrument associated with said beneficiary corresponding to each of said plurality of merchant stores, or a ratio of said balance amount of said first virtual currency instrument to an amount of monetary value funded to said first virtual currency instrument.

6. The method according to claim 1, further comprising generating a ranking of said selected said at least one merchant store based on said determined score associated with each of said plurality of merchant stores.

7. The method according to claim 1, further comprising generating a customized recommendation for said selection of said at least one merchant store based on said determined score associated with each of said plurality of merchant stores.

8. The method according to claim 7, wherein said generated customized recommendation comprises indication of said second virtual currency instrument associated with said at least one merchant store.

9. The method according to claim 7, wherein said generated customized recommendation comprises indication of a preferred merchant store associated with said beneficiary among said selected said at least one merchant store.

10. The method according to claim 9, wherein said generated customized recommendation comprises indication of at least one alternative merchant store associated with said beneficiary other than said preferred merchant store among said selected said at least one merchant store.

11. The method according to claim 1, further comprising receiving a ranking associated with said selected said at least one merchant store from at least one other user associated with said beneficiary.

12. The method according to claim 11, further comprising generating a customized recommendation for said selection of said at least one merchant store based on said determined score associated with each of said plurality of merchant stores and said received ranking associated with said selected said at least one merchant store.

13. A system, comprising:
a server that comprises circuitry configured to:
receive a recommendation request from a user, wherein
said recommendation request is for selection of at least one merchant store from a plurality of merchant stores,
said recommendation request is associated with a beneficiary, and
said user is different from said beneficiary;
determine a ratio of a first cumulative amount of monetary values spent by said beneficiary at each of said plurality of merchant stores to a second cumulative amount of monetary values added to a first virtual currency instrument by said beneficiary at each of said plurality of merchant stores, wherein said first cumulative amount of monetary values are associated with said first virtual currency instrument;
determine an average of amount of monetary values spent by said beneficiary for each transaction at each of said plurality of merchant stores;
determine a score associated with each of said plurality of merchant stores, based on a plurality of weighted parameters that includes a summation of said determined ratio and said determined average of said amount of monetary values, wherein said plurality of weighted parameters is associated with said beneficiary;
generate a recommendation of said at least one merchant store for said selection of said at least one merchant store based on said determined score associated with each of said plurality of merchant stores;
control a display screen, of an external device of said user, to display said at least one merchant store for said selection of said at least one merchant store;
issue a second virtual currency instrument associated with said selected at least one merchant store to said beneficiary; and
notify said beneficiary of said issuance of said second virtual currency instrument associated with said selected at least one merchant store to said beneficiary.

14. The system according to claim 13, wherein said plurality of weighted parameters comprises a frequency of usage of each of said plurality of merchant stores by said beneficiary.

15. The system according to claim 13, wherein said plurality of weighted parameters comprises at least one of
an amount of monetary value spent by said beneficiary at each of said plurality of merchant stores, wherein said amount of monetary value is associated with said first virtual currency instrument, or
a frequency of funding said first virtual currency instrument associated with each of said plurality of merchant stores.

16. The system according to claim 13, wherein said plurality of weighted parameters comprises at least one of a proximity of each of said plurality of merchant stores to a location of said beneficiary, one of a date or a time of usage of said first virtual currency instrument associated with each of said plurality of merchant stores or a type of each of said plurality of merchant stores.

17. The system according to claim 13, wherein said plurality of weighted parameters comprises at least one of a balance amount of said first virtual currency instrument associated with said beneficiary corresponding to each of said plurality of merchant stores, or a ratio of said balance amount of said first virtual currency instrument to an amount of monetary value funded to said first virtual currency instrument.

18. The system according to claim 13, wherein said circuitry is further configured to generate a ranking of said selected said at least one merchant store based on said determined score associated with each of said plurality of merchant stores.

19. The system according to claim 13, wherein said circuitry is further configured to generate a customized recommendation for said selection of said at least one merchant store based on said determined score associated with each of said plurality of merchant stores.

20. The system according to claim 19, wherein said generated customized recommendation comprises indication of said second virtual currency instrument associated with said at least one merchant store.

21. The system according to claim 19, wherein
said generated customized recommendation comprises indication of a preferred merchant store among said selected said at least one merchant store, and
said preferred merchant store is associated with said beneficiary.

22. The system according to claim 21, wherein said generated customized recommendation comprises indication of at least one alternative merchant store associated with said beneficiary other than said preferred merchant store among said selected said at least one merchant store.

23. The system according to claim 13, wherein said circuitry is further configured to receive a ranking associated with said selected said at least one merchant store from at least one other user associated with said beneficiary.

24. The system according to claim 23, wherein said circuitry is further configured to generate a customized recommendation for said selection of said at least one merchant store based on said determined score associated with each of said plurality of merchant stores and said received ranking associated with said selected said at least one merchant store.

25. A non-transitory computer-readable storage medium having stored thereon, computer executable instructions, which when executed by a computer, cause the computer to execute operations, the operations comprising:

receiving, at a server, a recommendation request for selection of at least one merchant store from a plurality of merchant stores, wherein said recommendation request is associated with a beneficiary;

determining, at said server, a score associated with each of said plurality of merchant stores based on a plurality of weighted parameters associated with said beneficiary;

generating, at said server, a recommendation for said selection of said at least one merchant store based on said determined score associated with each of said plurality of merchant stores;

controlling a display screen, of an external device of said user, to display said at least one merchant store for said selection of said at least one merchant store;

issuing a virtual currency instrument associated with said selected at least one merchant store to said beneficiary; and notifying said beneficiary of said issuance of said virtual currency instrument associated with said selected at least one merchant store to said beneficiary.

\* \* \* \* \*